US010109987B2

(12) United States Patent
Bazhinov

(10) Patent No.: US 10,109,987 B2
(45) Date of Patent: Oct. 23, 2018

(54) ENERGY MANAGEMENT APPARATUS TO UPGRADE AND CONTROL AN EXISTING CIRCUIT BREAKER PANEL

(71) Applicant: Coulomb Inc., Charlottesville, VA (US)

(72) Inventor: Alexander Bazhinov, Charlottesville, VA (US)

(73) Assignee: Coulomb Inc., Charlottesville, VA (US)

( * ) Notice: Subject to any disclaimer, the term of this patent is extended or adjusted under 35 U.S.C. 154(b) by 0 days.

(21) Appl. No.: 15/874,216

(22) Filed: Jan. 18, 2018

(65) Prior Publication Data

US 2018/0205206 A1    Jul. 19, 2018

Related U.S. Application Data

(60) Provisional application No. 62/447,847, filed on Jan. 18, 2017.

(51) Int. Cl.
*H02B 1/056* (2006.01)
*H02B 1/24* (2006.01)
*H02B 1/06* (2006.01)

(52) U.S. Cl.
CPC ............... *H02B 1/24* (2013.01); *H02B 1/056* (2013.01); *H02B 1/066* (2013.01)

(58) Field of Classification Search
CPC ...................................................... H02B 1/056
See application file for complete search history.

(56) References Cited

U.S. PATENT DOCUMENTS

| 5,373,411 | A | 12/1994 | Grass et al. |
| 5,455,760 | A * | 10/1995 | Bilas ................. H02H 3/00 700/22 |
| 5,861,683 | A * | 1/1999 | Engel ............. G01R 19/2513 307/147 |
| 6,612,873 | B2 * | 9/2003 | Reid .................. H01R 31/065 439/638 |
| 6,813,525 | B2 | 11/2004 | Reid et al. |
| 6,880,015 | B1 * | 4/2005 | Siders ................. H04L 29/06 370/464 |

(Continued)

OTHER PUBLICATIONS

PCT/US18/14205 Search Report, Written Opinion, and prior art cited therein as noted above (15 pages).

*Primary Examiner* — Robert J Hoffberg
(74) *Attorney, Agent, or Firm* — Woods Rogers PLC; Nathan A. Evans

(57) ABSTRACT

The present invention is an apparatus, and related method, with embedded functionality allowing a user to monitor and control energy consumption, including hardware installed in addition to an existing circuit breaker panel. A preferred embodiment comprises a retrofitting apparatus that can be connected to an existing circuit breaker panel. The apparatus can be detachably connected to circuit breakers or a circuit breaker panel. The apparatus and related method allow remote control of, for example, a processor, controller, and/or node, so that a circuit and/or load on a premises connected to a node on the apparatus can be remotely turned on or off, or otherwise regulated. The nodes, connectors, or processors may communicate with a remote device, such as a phone, computer, laptop, tablet, or other communication or computing device.

29 Claims, 23 Drawing Sheets

(56) References Cited

U.S. PATENT DOCUMENTS

| | | | |
|---|---|---|---|
| 7,386,424 B2 * | 6/2008 | DeBoer | G04C 23/26 |
| | | | 702/182 |
| 7,692,112 B2 * | 4/2010 | Deboer | H01H 89/06 |
| | | | 200/331 |
| 7,907,388 B2 | 3/2011 | DeBoer et al. | |
| 7,940,051 B2 | 5/2011 | Ulinskas | |
| 8,248,762 B2 | 8/2012 | Williams et al. | |
| 8,694,272 B2 | 4/2014 | Ewing et al. | |
| 9,412,546 B2 | 8/2016 | Ahn | |
| 9,595,825 B2 * | 3/2017 | Curt | G07F 15/003 |
| 9,653,890 B2 * | 5/2017 | Foerster | H05K 5/0017 |
| 2008/0167755 A1 | 7/2008 | Curt | |
| 2015/0153414 A1 | 6/2015 | Mills et al. | |
| 2015/0316594 A1 | 11/2015 | Kania et al. | |

* cited by examiner

ENERGY MANAGEMENT APPARATUS TO UPGRADE AND CONTROL AN EXISTING CIRCUIT BREAKER PANEL

CROSS-REFERENCE TO RELATED APPLICATIONS

The present application relies on the disclosures of and claims priority to and the benefit of the filing dates of U.S. Provisional Application No. 62/447,847, filed Jan. 18, 2017. The disclosures of that application are hereby incorporated by reference herein in their entireties.

BACKGROUND

Field of the Invention

The present invention is a device and accompanying system with embedded functionality allowing a user to monitor and control energy consumption, including hardware installed in addition to an existing circuit breaker panel. A preferred embodiment comprises a retrofitting apparatus that can be connected to an existing circuit breaker panel. The apparatus can be detachably connected to the panel by hooks, screws, or other connecting means. Alternatively, the apparatus can be mounted onto a wall or floor, or installed into a wall, next to an existing circuit breaker panel. Some or all fuses in the circuit breaker panel may be electrically connected in a circuit to keep the fuses of the existing circuit breaker panel connected to downstream electrical outlets and/or loads. The existing fuses may be connected to nodes in the claimed apparatus to create a closed loop with the outlets and/or loads. The nodes may comprise a processor(s) or controller(s) or the nodes may be connected to a processor(s) or controller(s) to manage energy consumption that is being measured from energy consumed by the downstream outlets and/or loads, from the overall power consumption, or by some other means.

The system will allow remote control of the processor(s), controller(s), and/or node(s) so that the outlet(s) and/or load(s) connected to that node(s) can be remotely turned on or off, or otherwise regulated. The nodes or processor(s) may communicate with a remote device, including but not limited to a phone, computer, laptop, tablet, or other communication orcomputing device, such as in one embodiment through the internet, and in another embodiment through cell phone signals, Bluetooth®, or Wi-Fi, to send information regarding energy consumption and providing the user with the option to turn on or off the outlet(s) and/or load(s) or otherwise control the power consumption at the downstream outlet(s) and/or load(s), at the circuit breaker(s), or at the circuit breaker panel(s).

Description of the Related Art

Prior to the invention disclosed herein, energy monitoring and control systems could generally be categorized into one of three broad groups.

In the first group, energy management systems were embedded into circuit breaker panels or certain parts of such panels. These systems allowed for monitoring and control of energy consumption on each circuit. However, to install such a system, a user had to undergo a full panel replacement or deep panel retrofit. Typically, a user had to purchase (or hire someone to purchase) a new circuit breaker panel that had built-in energy management functions. Such a user would have to replace (or hire someone to replace) the entire existing circuit breaker panel or larger parts of such panel with the purchased system. This prior art and the involved replacement costs, including hardware and services such as installation and electrical work, were prohibitively costly; one replacement typically required at least two or more full days of work to professionally install the management system.

In the second group, energy monitoring systems were installed inside a circuit breaker panel. Typically, these systems included a controlling unit and a plurality of current transformers (CTs) or some variation of such technology also known as non-intrusive load monitoring (NILM). These systems provided users with the ability to monitor energy consumption either on a main feed level or on a circuit-by-circuit level. Installation of such monitoring systems did not require a circuit breaker panel replacement, such as those in the first group described above, because they were installed inside an existing circuit breaker panel. However, these systems only allowed for monitoring of energy consumption by each circuit or groups of circuits. Such systems lacked the control functionality of the invention taught herein due to the limitations of the preexisting technology. In particular, these limitations refer to CTs (responsible for energy monitoring) that measure electrical current without physical connection to conductors (wires).

In the third group, energy monitoring and controlling systems were designed to manage energy consumption on a device level. This group of systems includes a plurality of devices that were typically installed in close proximity to the measured electric load (relatively far from the circuit breaker panel). Such devices were usually connected to an electric outlet and, thus, measured and controlled electric consumption of a device or group of devices connected to that particular socket. Such systems did not fulfill the purpose of managing energy consumption in a given premises and could only provide limited information per electric load. This inherent and meaningful limitation made it impossible for a user to obtain a full and comprehensive depiction of energy consumption since many electric loads do not use traditional electric sockets (for example, hardwired lighting and HVAC systems).

SUMMARY OF THE INVENTION

The object of the present invention is to provide users with a comprehensive energy management system over total energy consumption, including the possibility of a detailed analysis by each circuit level. In a preferred embodiment, users will have remote access and control over energy consumption on a circuit and/or downstream outlet and/or load level. In another embodiment, energy consumption is programmed or managed by a programmed computer system. In another embodiment, energy consumption can be managed by a set or sets of algorithms including self-learning systems, including but not limited to artificial intelligence or machine learning.

In preferred embodiments, the node(s), controller(s), processor(s), or some other computing means (e.g., CPU), include a programmed algorithm that monitors energy consumption and/or allows a user to remotely control energy consumption by way of an electronic device, such as through a cell phone, a tablet computer, or a laptop or desktop computer.

Another object of the present invention is to provide for a device to retrofit an existing circuit breaker panel using an adaptive apparatus and requiring installation of a single hardware unit, or several but related hardware units, specifically the claimed apparatus, or parts comprising a single or integrated hardware unit. This device connects to the circuits in the existing circuit breaker panel and downstream sockets and/or loads in a closed electric circuit, which can be monitored and controlled by the user of the device.

BRIEF DESCRIPTION OF THE DRAWINGS

The accompanying drawings illustrate certain aspects of some of the embodiments of the present invention, and should not be used to limit or define the invention. Together with the written description the drawings serve to explain certain principles of the invention.

DETAILED DESCRIPTION OF VARIOUS EMBODIMENTS OF THE INVENTION

Figure 1:
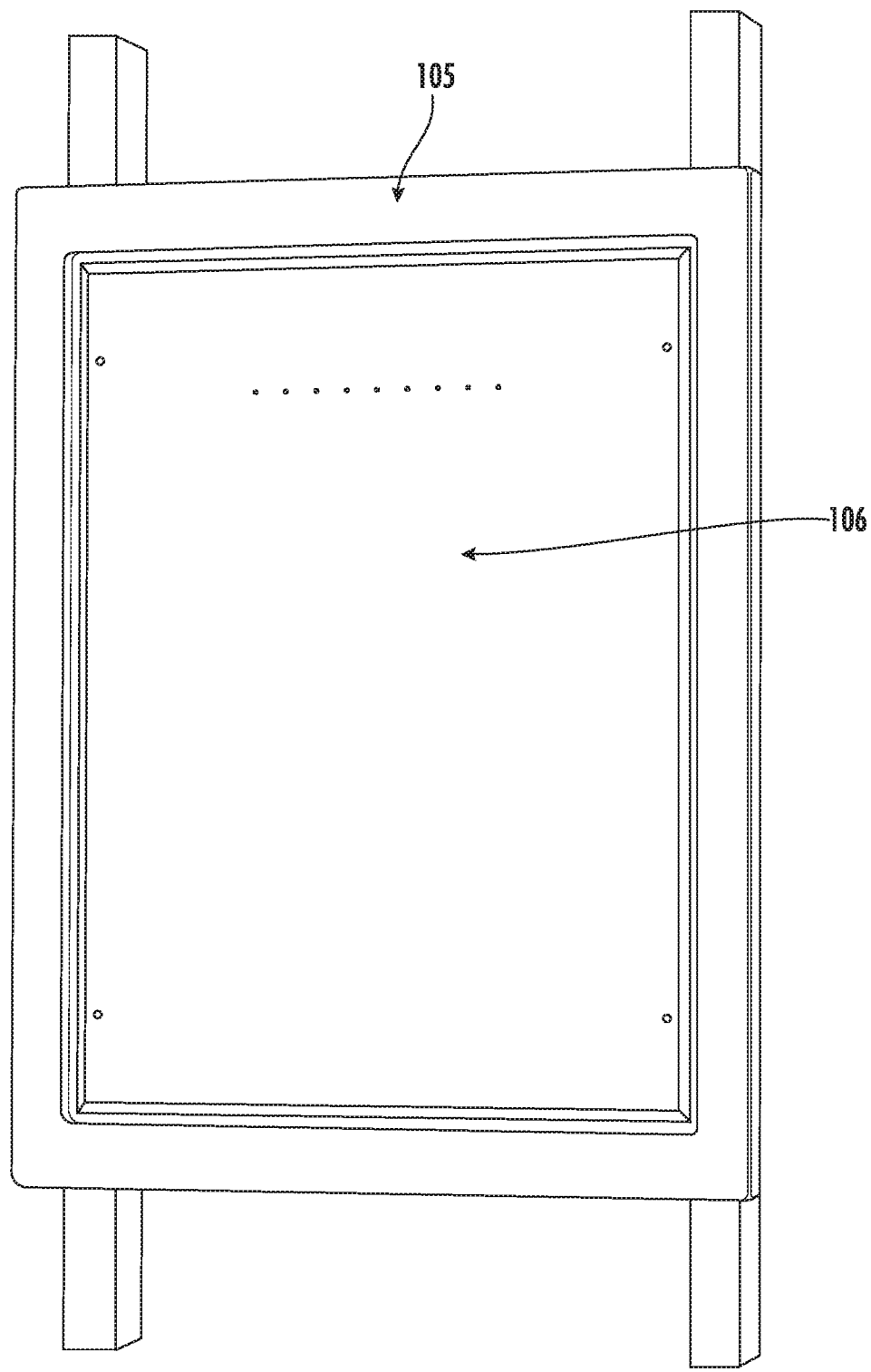
FIG. 1 is a schematic diagram of a depiction of one possible embodiment of the device as attached to and covering the existing circuit breaker panel.

The present invention has been described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design. Embodiments comprising various features may also consist of or consist essentially of those various features. Other embodiments of the invention will be apparent to those skilled in the art from consideration of the specification and practice of the invention. The description of the invention provided is merely exemplary in nature and, thus, variations that do not depart from the essence of the invention are intended to be within the scope of the invention. All references cited in this specification are hereby incorporated by reference in their entireties.

Embodiments of the invention also include a computer readable medium comprising one or more computer files comprising a set of computer-executable instructions for performing one or more of the calculations, steps, processes and operations described and/or depicted herein. In exemplary embodiments, the files may be stored contiguously or non-contiguously on the computer-readable medium. Embodiments may include a computer program product comprising the computer files, either in the form of the computer-readable medium comprising the computer files and, optionally, made available to a consumer through packaging, or alternatively made available to a consumer through electronic distribution. As used in the context of this specification, a "computer-readable medium" is a non-transitory computer-readable medium and includes any kind of computer memory such as floppy disks, conventional hard disks, CD-ROM, Flash ROM, non-volatile ROM, electrically erasable programmable read-only memory (EEPROM), and RAM. In exemplary embodiments, the computer readable medium has a set of instructions stored thereon which, when executed by a processor, cause the processor to perform tasks, base on data stored in the electronic database or memory described herein. The processor may implement this process through any of the procedures discussed in this disclosure or through any equivalent procedure.

In other embodiments of the invention, files comprising the set of computer-executable instructions may be stored in computer-readable memory on a single computer or distributed across multiple computers. A skilled artisan will further appreciate, in light of this disclosure, how the invention can be implemented, in addition to software, using hardware or firmware. As such, as used herein, the operations of the invention can be implemented in a system comprising a combination of software, hardware, or firmware.

Embodiments of this disclosure include one or more computers or devices loaded with a set of the computer-executable instructions described herein. The computers or devices may be a general purpose computer, a special-purpose computer, or other programmable data processing apparatus to produce a particular machine, such that the one or more computers or devices are instructed and configured to carry out the calculations, processes, steps, operations, algorithms, statistical methods, formulas, or computational routines of this disclosure. The computer or device performing the specified calculations, processes, steps, operations, algorithms, statistical methods, formulas, or computational routines of this disclosure may comprise at least one processing element such as a central processing unit (i.e. processor) and a form of computer-readable memory which may include random-access memory (RAM) or read-only memory (ROM). The computer-executable instructions can be embedded in computer hardware or stored in the computer-readable memory such that the computer or device may be directed to perform one or more of the calculations, steps, processes and operations depicted and/or described herein.

Additional embodiments of this disclosure comprise a computer system for carrying out the computer-implemented method of this disclosure. The computer system may comprise a processor for executing the computer-executable instructions, one or more electronic databases containing the data or information described herein, an input/output interface or user interface, and a set of instructions (e.g. software) for carrying out the method. The computer system can include a stand-alone computer, such as a desktop computer, a portable computer, such as a tablet, laptop, PDA, or smartphone, or a set of computers connected through a network including a client-server configuration and one or more database servers. The network may use any suitable network protocol, including IP, UDP, or ICMP, and may be any suitable wired or wireless network including any local area network, wide area network, Internet network, telecommunications network, Wi-Fi enabled network, or Bluetooth® enabled network. In one embodiment, the computer system comprises a central computer connected to the internet that has the computer-executable instructions stored in memory that is operably connected to an internal electronic database. The central computer may perform the computer-implemented method based on input and commands received from remote computers through the internet. The central computer may effectively serve as a server and the remote computers may serve as client computers such that the server-client relationship is established, and the client computers issue queries or receive output from the server over a network.

The input/output interfaces may include a graphical user interface (GUI) which may be used in conjunction with the computer-executable code and electronic databases. The graphical user interface may allow a user to perform these tasks through the use of text fields, check boxes, pull-downs, command buttons, and the like. A skilled artisan will appreciate how such graphical features may be implemented for performing the tasks of this disclosure. The user interface may optionally be accessible through a computer connected to the internet. In one embodiment, the user interface is accessible by typing in an internet address through an industry standard web browser and logging into a web page. The user interface may then be operated through a remote computer (client computer) accessing the web page and transmitting queries or receiving output from a server through a network connection.

This invention describes a hardware apparatus (also referred to herein as the device or apparatus) comprising, in one embodiment, a base frame or containing unit that electrically, mechanically, and/or structurally attaches to an existing circuit breaker panel, parts of such panel, wall, wall studs or floor in proximity of an existing circuit breaker panel and serves as an attachment base or containing unit for components. In another embodiment, the apparatus comprises a mounting base or containing unit within which certain parts are included and which is electrically, mechanically, and/or structurally coupled, associated with, combined with, linked, paired, fastened, joined, attached, and/or connected to a circuit breaker panel, circuit breakers, parts of such panel, wall, wall studs or floor in proximity of an existing circuit breaker panel. The containing unit includes, but is not limited to, a box, on open-sided box, enclosure, protective structure, ornamental structure, or anything else that is able to hold, contain, or have components affixed to it. The apparatus, in one aspect, comprises:

A containing unit, base frame, or mounting base;

electric sockets, terminals, and/or lugs designed to pass high-voltage electricity from existing circuit breakers to existing circuits/loads, wherein the sockets are paired to accommodate high-voltage input and output lines located in such a manner to allow for measurement and/or control of high voltage electricity by below-mentioned relay(s) and sensor(s);

high voltage electric lines running from electric sockets, terminals, and/or lugs designed to pass high-voltage electricity from existing circuit breakers to existing circuits/loads, wherein the sockets are paired to accommodate high-voltage input and output lines located in such a manner to allow for measurement and/or control of high voltage electricity by below-mentioned relay(s) and sensor(s), in one embodiment, to connection rails, node(s), grouping(s) of nodes, circuit board(s), and/or containing unit, wherein the lines are paired to accommodate high-voltage input and output electricity flow;

optionally replaceable nodes or grouping(s) of nodes designed for particular electric current, each comprising:

a current sensor(s) designed to measure electric current by circuit or group(s) of circuits;

a voltage sensor(s) designed to measure electric voltage by circuit or group(s) of circuits;

an electric relay designed to switch on and off electric power by circuit or group(s) of circuits;

in one aspect, a computer chip(s) serving to receive, convert, process, store, and/or send signals to/from aforementioned current sensor(s) and voltage sensors(s);

in one aspect, a computer chip(s) serving to receive, convert, process, store, and/or send signals to/from aforementioned relay;

in one aspect, a computer chip(s) serving to receive, convert, process, store, and/or send information, signals, algorithms, and/or computer code to/from other parts of the apparatus such as other nodes, grouping(s) of nodes, other chip(s), other controller(s), or below-mentioned processing unit as well as other devices, computers, and/or servers by means of wired or wireless connection;

electric sockets, prongs, terminals, and/or lugs;

in one aspect, a port(s), pin(s) and/or other means for wire connection for the purposes of initial setup and/or troubleshooting of the node;

in one embodiment, an LED light(s);

in one embodiment, one or multiple physical buttons for the purposes of initial setup and/or troubleshooting of the node;

a circuit board(s) hosting the aforementioned parts;

an enclosure hosting the aforementioned parts;

connectors for attachment to a connection rail, base frame, containing unit, mounting base, a circuit board, a back plane, or other nodes (although nodes do not have to be coupled to a containing unit; they may be stand alone or connected to or associated with a circuit board); and/or sockets or prongs to connect a node to for example, a back plane;

in one aspect, a back plane that has sockets and/or prongs for attachment of the aforementioned nodes or grouping(s) of nodes, wherein each socket and/or prong is isolated from other sockets and/or prongs so that high-voltage electricity remains within the designed circuit, and each socket and/or prong has low-voltage connection lines going to the processing unit;

a processing unit receiving, processing, storing, and/or sending signals from and/or to the aforementioned nodes, backplane, or groupings of nodes, comprising:

a computer chip(s) that runs the software operating the device;

a computer chip(s) designed to send and/or receive low-voltage signals to and/or from the aforementioned nodes;

a wireless communication module(s) enabling connection to external devices and/or Internet connection;

in one aspect, a port(s) for wire connection for the purposes of initial setup and/or troubleshooting of the processing unit;

a power connector, power adapter, and/or power module designed to receive electrical power to run the processing unit and/or aforementioned nodes;

in one embodiment, a voltage sensor(s) designed to measure electric voltage;

connectors designed to attach to the connection rails, back plane or elsewhere;

in one aspect, connectors designed to power LED illumination on the apparatus;

a circuit board or multiple circuit boards hosting, holding, connecting, aggregating, containing, attaching, affixing, placing in, on, or near, resting, sitting, enclosing, including, surrounding, retaining, confining, joining, relaying, relating, uniting, linking, tying, and/or associating the aforementioned parts;

one or multiple physical buttons for the purposes of initial setup and/or troubleshooting of the processing unit;

an enclosure hosting, holding, connecting, aggregating, containing, attaching, affixing, placing in, on, or near, resting, sitting, enclosing, including, surrounding, retaining, confining, joining, relaying, relating, uniting, linking, tying, and/or associating the aforementioned parts;

a power supply line in the form of, for example, a circuit breaker connected to the existing circuit breaker panel, wherein the power lines run from the aforementioned processing unit to the aforementioned circuit breaker;

in one embodiment, a battery designed to charge from the aforementioned power supply line and power the nodes(s) and/or processing unit as a whole or certain parts of it during grid down times;

an optional cover frame that attaches to the aforementioned base frame, containing unit, or mounting base, whereby the cover frame is designed to cover the aforementioned parts of the device. In one aspect, the cover frame is designed in such a way that the circuit breaker panel cover is attached to the aforementioned cover frame. Moreover, the cover frame, containing unit, or mounting base, in one embodiment, has built-in illumination, such as LED illumination, and connectors to receive power from the aforementioned processing unit, one or multiple physical buttons for the purposes of initial setup, troubleshooting of the processing unit, or other purpose, and, in one aspect, a port for wire connection(s) for the purposes of initial setup, troubleshooting of the processing unit, or other purpose; and/or an optional source of sound such as a dynamic or beeper that may be coupled with the aforementioned processing unit or cover frame. In one aspect, the source of sound may be used for sending signals to the user and/or technician to indicate a current state of the device, respond to certain actions taken by the user (for example, pressing buttons), or troubleshooting.

A back plane, or connection rail, is, in embodiments, a circuit board(s) including multiple sockets and/or prongs for receiving, for example, nodes, sensor boards, circuit boards, or groupings of nodes, as explained herein.

In a preferred embodiment, the invention is a stand-alone product that is coupled or connected to an existing circuit breaker panel. Specifically, the invention is a device that extends the capabilities of an installed circuit breaker box by adding monitoring and controlling features to each separate circuit. In one embodiment, the device is shaped as a frame that is attached externally to an existing circuit breaker box. In another embodiment, the device is a box or mounting base to which the parts of the apparatus can be installed, contained, coupled, or attached (e.g., see FIGS. 8-10, 15-25). Once the device is connected to an existing circuit breaker box, one or more circuits in the box will be rewired to connect to the device.

In one embodiment, an apparatus comprises one or more containing units, which may be boxes, frames, panels, bases, or any other structure which may house components or be affixed to components. The parts of the apparatus may be contained in one unit, such as a metal or plastic box. In other aspects, the parts may be placed in more than one unit; such as multiple metal or plastic boxes. In another aspect, the parts may be in or on an existing circuit breaker panel. The parts of the apparatus may comprise:

electrical connection(s) to a circuit breaker(s);

a relay or relays;

a current and/or voltage sensor or sensors;

electrical connection(s) leading to and/or from an electrical load(s), for example, on a premises;

controlling unit or units connected to one or more nodes;

processing unit or units connected to one or more nodes or controlling units, the processing unit(s) comprising a computer chip(s) that runs the software operating the device, a computer chip(s) designed to send and/or receive low-voltage signals to and/or from the aforementioned nodes, and/or a wireless communication module(s) enabling connection to external devices and/or Internet connection.

A node may comprise a current sensor(s) designed to measure electric current by one or more circuits, a voltage sensor(s) designed to measure electric voltage by one or more circuits, and an electric relay designed in part to switch on or off electric power from the one or more circuits.

In one example, the installation process comprises:
unmounting wires connecting one or more circuit breaker inside the existing circuit breaker box with an electrical load inside the premises;
mounting said wires into output electrical sockets, terminals, and/or lugs on the device allowing for connection of one load wire per one output socket, terminal, and/or lug of a single node in the device; and
mounting wires or otherwise connecting electrical input sockets, terminals, and/or lugs on the device and existing circuit breakers allowing for one connection per one input socket, terminal, and/or lug of a single node in the device with a single circuit breaker.

In another embodiment, the device may be or include a high-voltage connector bar comprising (see FIG. 25):
a base, such as a board or a back plane, one or more connectors to attach nodes to circuit breakers in a circuit breaker panel, and one or more connectors to attach nodes to the apparatus, controlling units, processing units, or electrical loads, for example, on a premises. Such a high-voltage connector bar may be used to streamline the installation process and wiring of high-voltage wires conducting electricity from circuit breaker(s) to the device and/or the device to load(s) and/or appliances.

In certain embodiments, structural features making the device different from existing solutions include, among other features described herein, the position of energy monitoring sensors, relays, and processing unit that is external to or separate from the existing circuit breaker box or existing circuits breakers. Also, the frame or frames, or mounting base or bases, or containing unit or units, are attached to an existing circuit breaker box, in a preferred embodiment, externally so as to retrofit the existing circuit breaker panel. In colloquial terms, the invention described herein transforms an existing circuit breaker panel into an interactive, "smart" circuit breaker panel, which currently does not exist in the art.

Beneficial features of the present invention to the user include, among other things described herein: the ability to provide for a full or partial energy management system for a premises with detailed consumption breakdown and control, and the ability to obtain such energy management system for a premises without the need to perform costly and lengthy circuit breaker panel replacement/installation.

The present invention adds energy management capabilities when attached to an existing circuit breaker box. While the core purpose of a circuit breaker box is to distribute electricity from the main feed to multiple circuits, the invention brings new features to such a circuit breaker panel, such as the ability to monitor and control electricity consumption, including remotely.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 2:
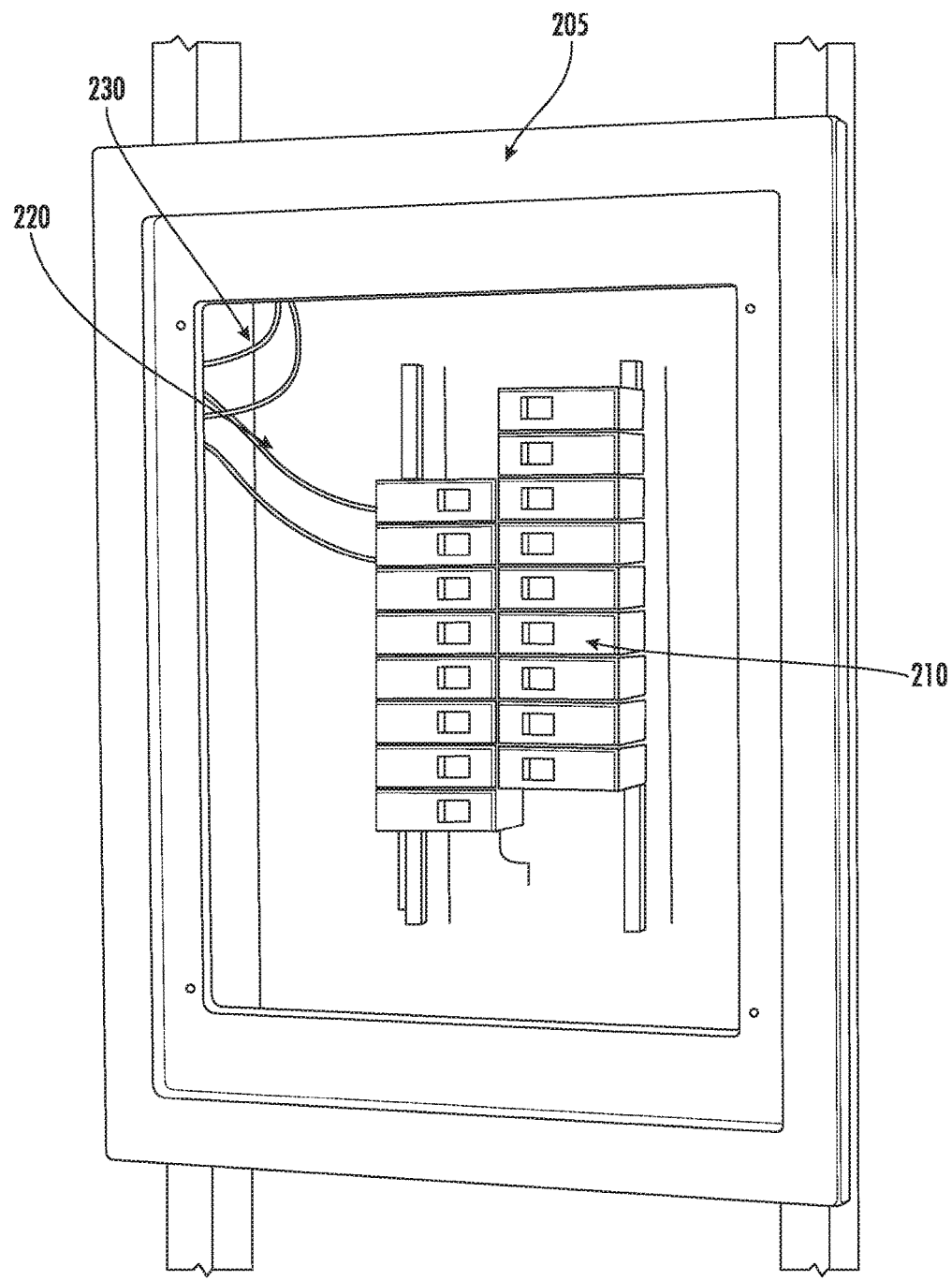
FIG. 2 is a schematic diagram of a depiction of one possible embodiment of the device with the circuit breaker panel cover removed and the internal aspects of the device and panel shown.
Figure 3:
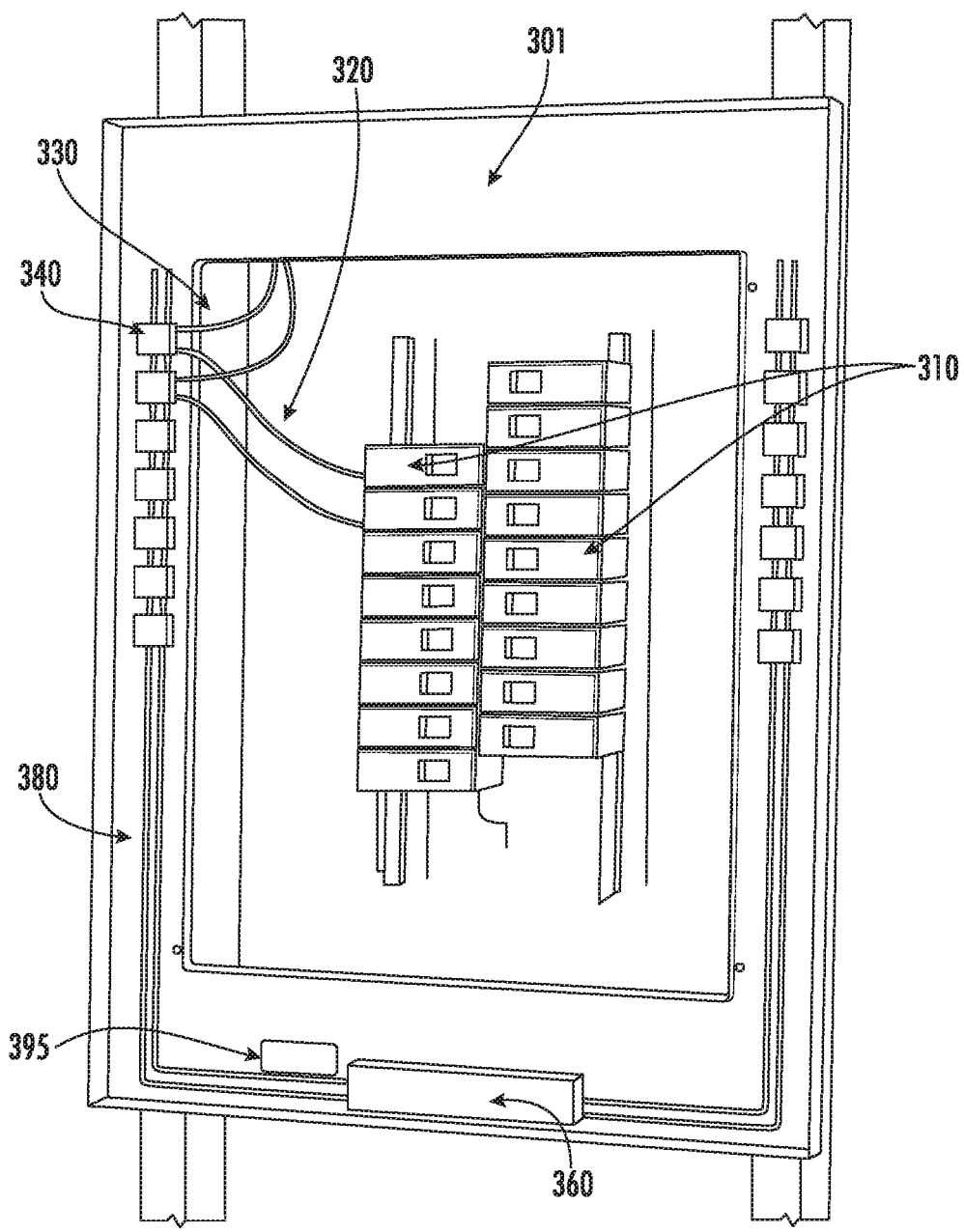
FIG. 3 is a schematic diagram of a depiction of one possible embodiment of the device with the cover and the frame removed and the internal aspects of the device shown.

Now turning to particular figures, FIG. 3 is a pictorial diagram of an embodiment of the apparatus according to the present invention. (FIGS. 1, 2, and 5 show other perspectives of an embodiment of the device in less detail than what is shown in FIG. 3, but these figures give a broader perspective on possible embodiments of the apparatus as a whole.) The cover frame for the apparatus 105 in FIG. 1 (205 in FIG. 2; 505 in FIG. 5) and the front cover of existing circuit breaker panel 106 in FIG. 1 (506 in FIG. 5) are removed in FIG. 3, showing, for example, the nodes 340, a connection rail 380, the processor 360, a battery 395, and other components. The cover frame 105 in FIG. 1 (205 in FIG. 2; 505 in FIG. 5) as attached to the base frame 301 (see also 501) appears in FIGS. 1, 2. The nodes 340 of the apparatus are explained in more detail in FIG. 4 and FIG. 6 and generally in this application. They are electrically connected 320 (see also 220) to the existing circuit breaker panel's circuit breakers 310 (see also 210). These nodes communicate power consumption to the processor 360 through wires or, for example, the connection rail 380. The processor then monitors and controls energy consumption by way of algorithms or user input. The algorithm or user input then provides feedback to the node 340 which controls downstream outlets, electrical loads, and/or hardwired devices, such as lights, home appliances, etc. through electrical connections 330 (see also 230).

The processor 360 also allows for communication with an electronic device such as a phone, computer, or tablet (e.g., Apple iPad). The electronic device may be external to, in addition to, remotely located, or otherwise considered outside of the configuration of the inventive apparatus. This may be accomplished by, in certain embodiments, a Bluetooth® connection, Wi-Fi signal, or Internet connection. In an embodiment, the processor will send encrypted energy consumption related information to an outside device or group of devices. The user of the apparatus taught herein and outside device (e.g., an energy consumer, utility company customer, utility company, etc.) will be able to monitor and control energy consumption. In one embodiment, the processor sends for display on the outside device energy consumption on a circuit-by-circuit level or by load, outlet, appliance, etc. on the circuit(s). The user will have the option to turn off or otherwise modulate that circuit depending on what outlet, load, and/or appliance is served by that circuit. For example, if a light in the bedroom of a premises with the apparatus claimed herein is left on and consuming energy, this will be communicated to the processor, which will then alert a user of a remote device (e.g., cell phone) and give the user the option to turn off the circuit, thereby stopping delivery of electricity to the lamp and therefore saving energy. A battery 395 could be located in or around the device or the device could be powered by some other means. A battery may be used if power to the circuit breaker panel is lost, or if LED lights or other indicators on the device may be implemented to notify a user of the device's location, or to indicate device and/or other status.

Figure 4:
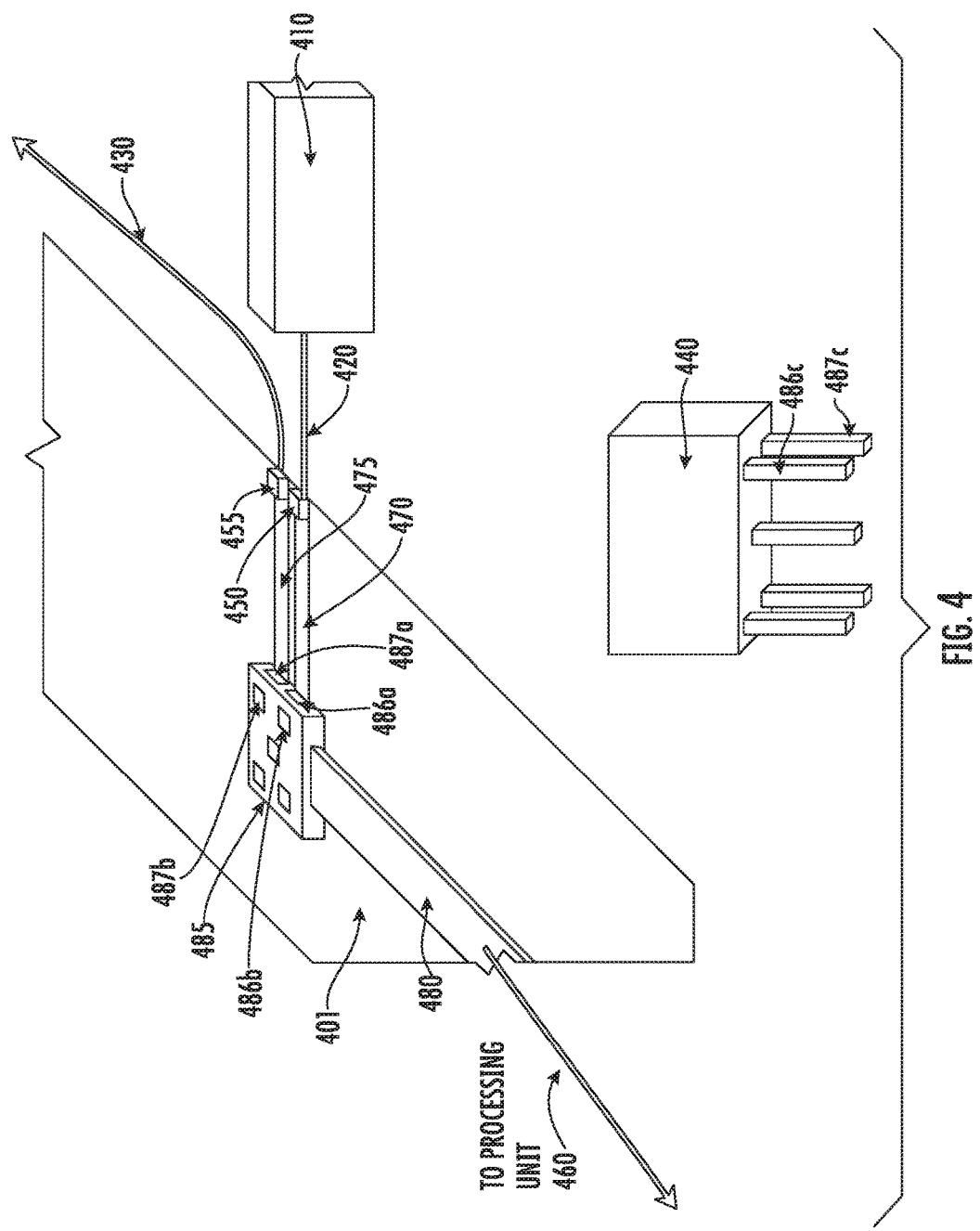
FIG. 4 is a schematic diagram of a close-up depiction of one possible embodiment of the node and internal wiring of the device connected to circuits on the existing circuit breaker panel.
Figure 5:
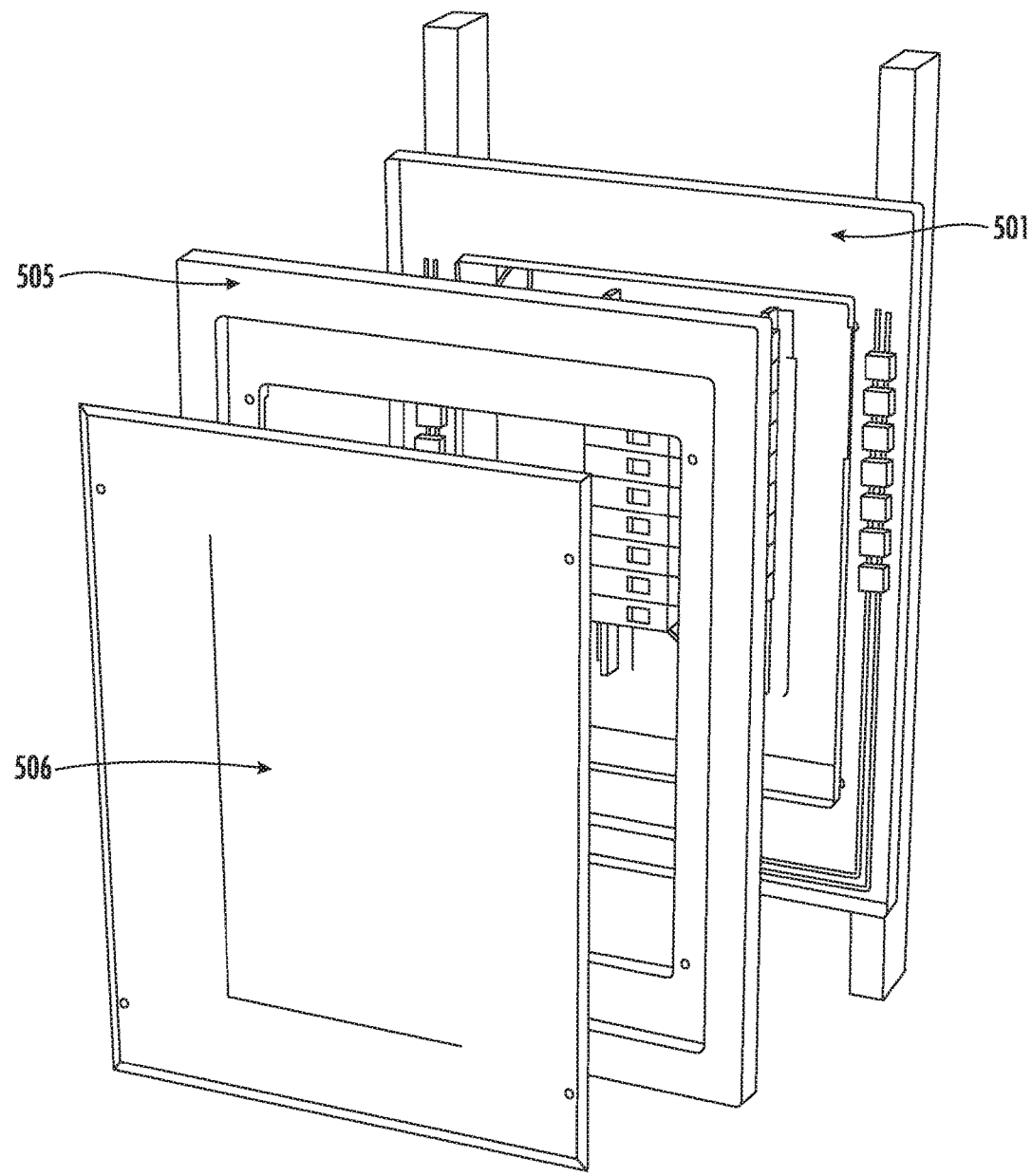
FIG. 5 is a schematic diagram of a depiction of the cover, frame, and internal components of one possible embodiment of the device, separated from one another.

FIG. 4 is a pictorial diagram of an embodiment of the apparatus according to the present invention. In one aspect, a base frame 401 allows for mounting of the device onto an existing circuit breaker panel. In addition, the base frame 401 serves as a basis for attachment of other components of the device such as:

electric connectors, such as sockets, terminals, lugs, or plugs 450, 455,
  high voltage electric lines 470, 475,
  connection rail 480,
  processor 460,
  battery (395 in FIG. 3),
  and cover frame (105 in FIGS. 1 and 205 in FIG. 2), which, in embodiments, is placed over base frame 401.

Electric sockets 450, 455 serve as input and output points for electricity flowing from a circuit breaker 410 through the device to various electric loads in the premises. Once the device is installed, an input electric socket 450 is connected by a wire or group of wires 420 with a single circuit breaker 410. An output electric socket 455 is connected by a wire or group of wires 430 with an electric load. In one embodiment, the input/output sockets 450, 455 are paired in a manner allowing for a single input/output socket pair to be connected to a single node socket/pad 485 and node 440 by means of high voltage electric lines 470, 475.

In embodiments, high voltage electric lines 470, 475 connect input/output electric sockets 450, 455 and node pads 485 and the replaceable nodes 440 installed or otherwise connected to node pads 485. The lines 470, 475 conduct high voltage electricity (e.g., 120V). The lines 470, 475 are paired in a manner for a single input/output pair of lines to be connected to a single pair of side sockets 486a, 487a on the node pad 485, which may be part of or attached/connected to a connection rail 480.

In one embodiment, electrical input is passed from high voltage electric socket 486a to electric socket 486b, both of which are located on the node pad 485. Electrical output is passed from electrical socket 487b to electrical socket 487a, and then through high voltage line 475. That current flows through socket 455 to wire 430 and out to electric loads on for example a premises.

In one embodiment, an optionally replaceable electric node 440 serves to conduct electricity from electrical socket 486b to 487b. Such electrical flow is conducted through the node using pins 486c and 487c. For example, electric current passing through electric socket 486b connects to pin 486c, passes through, is measured by, and is modulated by the node as will be explained herein, and then passed back through pin 487c to electrical socket 487b.

Nodes 440 may come in a variety of grades based on the electric current they are designed to conduct. For example, a current supplied through a 15 amp circuit breaker is preferably served by a 15-20 amp grade node. In one aspect, specific grade of the node 440 for each node pad 485 on the connection rail 480 may be chosen at the time of installation based on the grade of the circuit breaker connected to input electric socket 450. A node 440 may, in one aspect, comprise a circuit board that hosts multiple elements such as, for example, a current sensor, a voltage sensor, a relay, LED lights, button(s), high voltage connector pins (e.g., 486c, 487c), and low voltage connector pins. In an embodiment, a node 440 has a plurality of connector pins. In one aspect, two pins 486c, 487c serve as input/output high voltage connectors receiving/sending electricity from/to sockets 486b, 487b located on the node pad 485. Other pins serve to provide power to the circuit board and its elements as well as to transmit current sensor readings and receive on/off commands from processing unit 460. In one aspect, LED lights serve to indicate a node's status through various combinations of timing, intensity and colors of the lights. Button(s) may serve to test, reset, troubleshoot or otherwise interact with the node.

In one embodiment, a node 440 is encapsulated into an enclosure that covers and protects elements of the node. Such enclosure may have openings for connector pins (e.g., 486c, 487c, and others) and, in one aspect, LED lights and/or button(s). Once installed, a node 440 takes, in one example, constant, semi-constant, frequent, periodic, manual, programmed, singular, and/or regular measurements of electric flow on the connected circuit. The measurements are communicated to the processor 460 through, for example, the connection rail 480 using one or multiple communication protocols such as but not limited to CANBus, Ethernet, I2C, SPI or other protocols. Upon receipt of command signals from the processing unit 460, a node 440 turns on or off a relay controlling electricity flow.

In an embodiment, the connection rail 480 serves as a base for node pads 485 designed for mounting of optionally replaceable nodes 440, which plug into the node pad 485, as well as a communication bridge between the node 440 and processing unit 460. In one aspect, the connection rail 480 is attached to the base frame 401. The connection rail 480 may have a plurality of node pads 485 for mounting replaceable nodes 440. In one aspect, each node pad 485 on the connection rail 480 has a number of connection ports or terminals (e.g., 486b, 487b) corresponding to the number and size of connector pins (e.g., 486c, 487c) on a replaceable node 440.

In one embodiment, two of such ports 486b, 487b are connected with respective input/output sockets 486a, 487a in the node pad 485 which is on a connection rail 480 and connected respectively to high voltage lines 470, 475. This connection is designed to conduct high voltage electricity and connect a node's input/output high voltage connector pins 486c, 487c to high voltage electric lines 470, 475. In one embodiment, port(s) of each node pad 485 serve to provide power to the circuit board in/on the node 440 and its elements as well as to transmit current sensor readings and receive on/off commands from processing unit 460. The ports other than the high-voltage ports are designed to be low voltage and are placed and shaped to receive corresponding connector pins on a replaceable node 440. In one aspect, each node pad 485 on the rail 480 is isolated from other node pads so that high-voltage electricity remains within the designed circuit. In another embodiment, the node pads and corresponding nodes may link or connect by way of communication means (e.g., 480). The connection rail 480 may have a plurality of low voltage connection lines transmitting signals between nodes 440 and processing unit 460.

A processing unit 460, such as in one embodiment a "computer processing unit" or CPU, serves as a processing and communications center for the device. In one embodiment, the processing unit 460 is attached to the base frame 401. The processing unit, in one embodiment, comprises a circuit board or multiple circuit boards that host multiple elements including, by way of example, a processor chip(s), a controller chip(s), a voltage sensor(s), a wireless communication chip (or multiple chips), a port(s) for wired connection, a power connector(s) and/or power supply/converter(s), ports for mounting on connection rail(s), various connectors powering cover frame LED illumination, and/or physical buttons. Once installed, the processing unit 460 receives measurements of electric current and voltage taken by the nodes 440 as well as sends back signals to the nodes to open/close relays, among other things. Information on electric current and voltage received from the nodes 440 is processed by software or algorithms running on the processor chip(s), controller chip(s) or running remotely. In one aspect, the information may be communicated to a remote server over the Internet by means of wired or wireless connection. The processing unit 460 may have a plurality of low voltage ports for proper attachment of low-voltage connection lines embedded into the connection rail 480. Through these ports processing unit 460 receives and sends signals from/to nodes 440. The processing unit 460 may send signals to the nodes 440 that will result in opening or closing specific relays to turn on and off respective circuits. Such signals may be based on commands generated by the software on the processor, controller or the web-based server, or commands generated by a user via various input methods such as Internet website interface, mobile app interface, home energy monitor screen interface, physical buttons and others. The processing unit 460 also sends various signals to control cover frame LED illumination to reflect various states of the device. Based on the state of the grid or other conditions, processing unit 460 may be powered either through the power line or by the battery (395 in FIG. 3). Whenever processing unit 460 is powered through the grid, it may charge the battery. The processing unit may be encapsulated into an enclosure that covers and protects all elements of the unit.

In embodiments, a power supply line serves as the main source for electric supply to the device. The power supply line connects a circuit breaker(s) located in an existing circuit breaker box with a power adapter/converter installed in the device separately or as a part of the processing unit. In one embodiment, the device may receive power from one or more of the controlled circuit lines and/or existing circuit breaker(s).

In embodiments, a battery (395 in FIG. 3) may serve as an additional power source for the device during grid power outages. In one aspect, a battery is attached to the base frame 401. In another aspect, a battery is an integral part of the processing unit and is attached directly or indirectly to the processing unit circuit board. A battery is charged by electricity supplied through a power line. During grid down times, a battery powers the device as a whole, or certain parts of it.

In one aspect, a cover frame (105 in FIG. 1) allows for casing of all elements of the device. A cover frame may be attached to the base frame 401. A cover frame may be designed in such a way that an existing cover of a circuit breaker panel (106 in FIG. 1) can be mounted over the cover frame, or act as the cover frame. A cover frame may include, in one aspect, built-in LED lights facing externally or internally. These lights may be powered and controlled through a connector located on the cover frame. The LED lights may be powered and controlled by the processing unit 460.

In another aspect, the cover frame (105 in FIG. 1) may include physical buttons for the purposes of initial setup, controlling, testing, upgrading and/or troubleshooting of the processing unit 460 or overall device or system. In another aspect, the cover frame (105 in FIG. 1) may include a port(s) for wire connection(s) for the purposes of initial setup, testing, upgrading, controlling, and/or troubleshooting of the processing unit, or other purposes.

Figure 6:
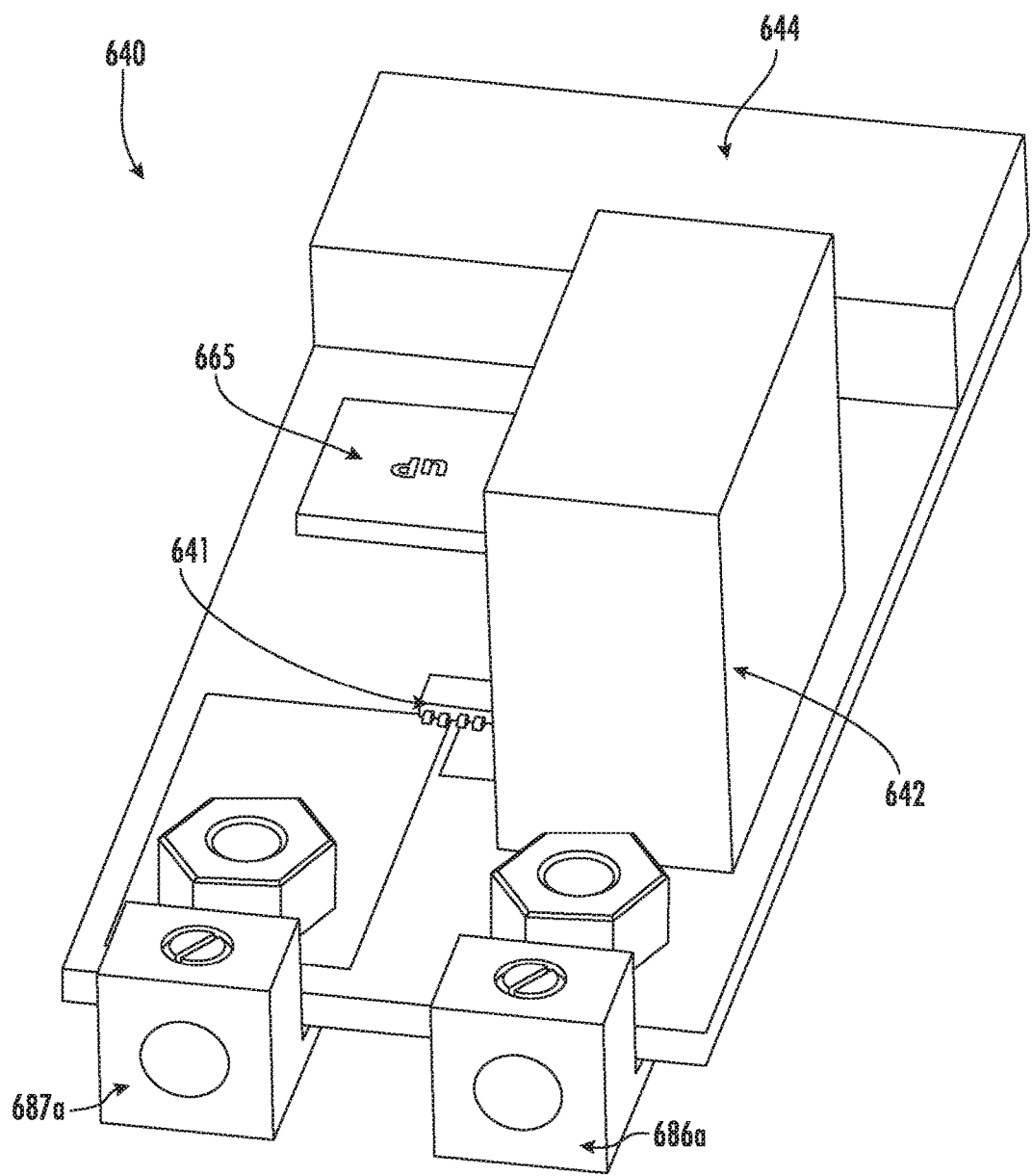
FIG. 6 is a schematic diagram of a close-up depiction of one possible embodiment of the node.

FIG. 6 shows another embodiment of a single node 640. In one embodiment, two ports 686*a*, 687*a* are connected to high voltage lines. In this example, port 686*a* receives high voltage power from the circuit breaker and port 687*a* leads to electrical load(s) on a premises. Between the input and output ports are the components of the node. In this example, a high voltage relay 642 can switch on and off electric power on a circuit-by-circuit basis. A current sensor 641 is included to measure electric current by one or more circuits and/or a voltage sensor 641 is included to measure electric voltage by one or more circuits. In one embodiment, connector 644 of each node serve to provide power to the circuit board in/on the node and its elements, as well as to transmit current sensor readings and receive on/off commands from the processing unit. In another embodiment, the nodes may link or connect by way of wired or wireless communication to other nodes, other controllers, or the processor. For example, the nodes may be connected by one or a plurality of low voltage connection lines transmitting signals between nodes, controllers, and/or the processing unit. In one aspect, a single node 640 can have a controller chip 665 to run a pre-defined software code and/or receive, send, process, store, analyze and otherwise work with information received from current and/or voltage sensor(s) 641. In another aspect, the controller chip 665 can execute on/off commands, read information and/or otherwise operate the relay 642.

Figure 7:
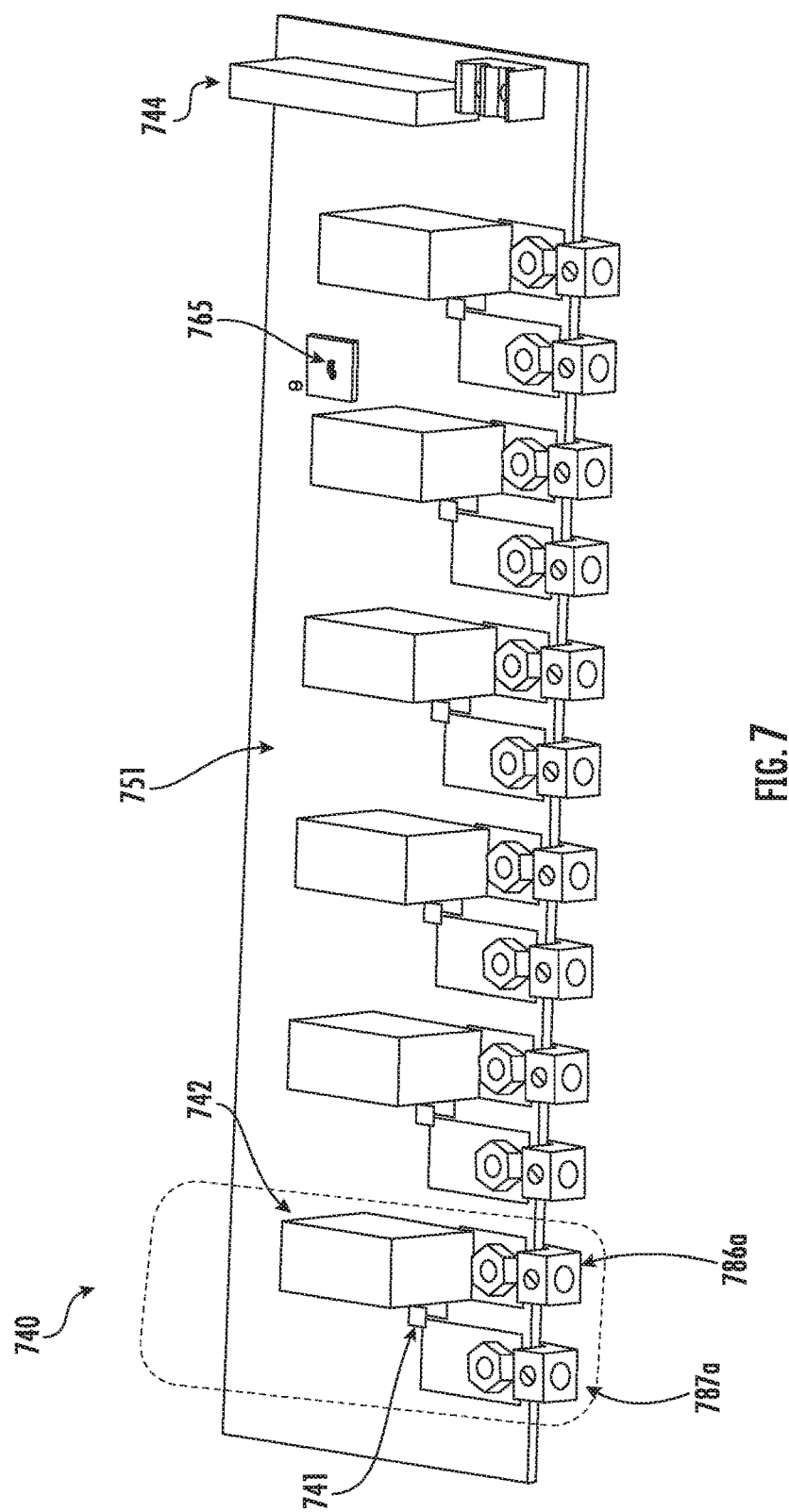
FIG. 7 is a schematic diagram of a depiction of one possible embodiment of a group of nodes on a circuit board.

FIG. 7 shows an example group of nodes hosted on a single circuit board 751. Such nodes 740 may be in communication with other nodes, a controller 765, the processing unit (such as 960 in FIG. 9), and/or a connector port 744. Multiple nodes may be placed on a single circuit board 751 and communicate by low voltage connection lines or wirelessly with other nodes, other group(s) of nodes, other circuit board(s), a controller chip(s), or the processing unit. The node may comprise the parts exemplified in FIG. 6 and FIG. 7, such as the line in 786*a*, relay 742, sensor(s) 741, and line out 787*a*. In embodiments, these boards 751 may be grouped on a back plane.

Regarding the controller 765, a controller is generally, in embodiments, a computer chip that runs a pre-defined software code. For examples, unlike a processor chip that may have an operating system (e.g., Windows® or Linux®) where multiple tasks may be accomplished (such as using Microsoft® Office applications and playing videogames), a controller may have a pre-created set of codes or algorithms, which would run them in circles or loops. For example, the code may instruct: Read a signal on Channel 1—Convert the data from analog format into digital format—Send the data to Channel 5—Go back to Reading a signal on Channel 1.

Turning back to FIG. 7, the controller 765 in this example reads signals generated by sensor(s) 741 placed on each individual circuit. In some aspects, the sensor(s) generates analog signal(s). In other cases, a digital signal(s) is produced or an analog signal(s) is converted into digital signal(s). In one embodiment, the controller is set to measure each circuit several thousand times per second. The controller, in this example, then converts these signals from analog to digital format. In some cases, an analog signal is relatively susceptible to noise (unlike a digital signal, which is typically binary code). Accordingly, in some cases, the closer the controller chip(s) is to the sensor(s), the better it is for the signal received by a controller or processor.

Once the signal is received, the controller applies certain mathematical equations to the signal. For example, the controller may calculate an average number from the thousands of readings before transmitting to the processor. Other calculations may include, but are not limited to, Fourier transform, allocation of local maximums and minimums, and oversampling.

Then the controller uses certain communication protocols, such as CAN bus, Ethernet, USB, SPI. or I2C, to send the resulting data to the processor, which, in turn, has an operating system, such as Linux, and a number of applications running, such as Wi-Fi, auto-updater, and other programs. Thus, a controller works with one or multiple circuits or nodes, since, in aspects, one of its functions is to perform necessary operations on the data provided by sensors.

Figure 8:
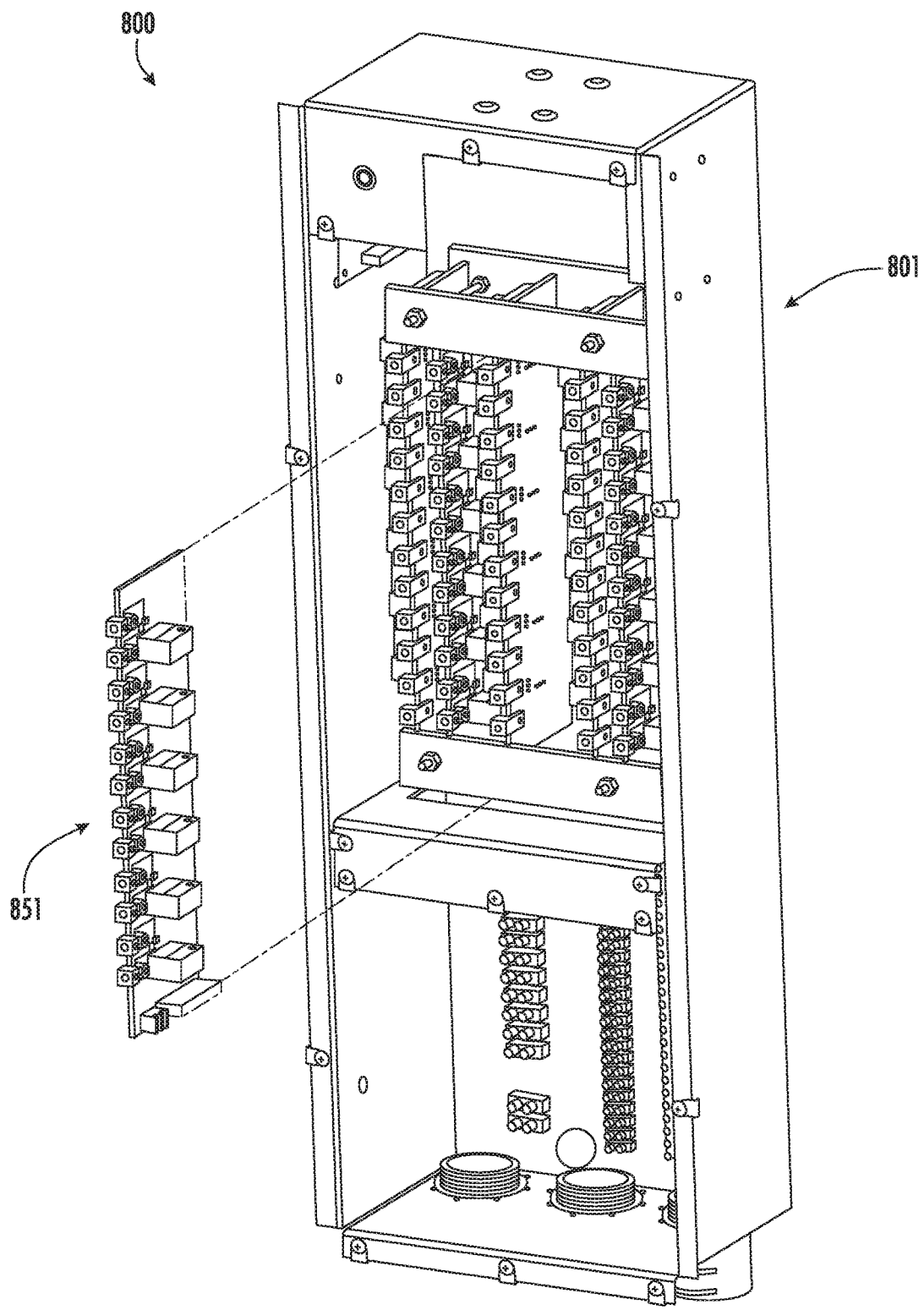
FIG. 8 is a schematic diagram of a depiction of one possible embodiment of the device with the internal aspects of the device shown, including groups of nodes on circuit boards placed in the overall device.
Figure 9:
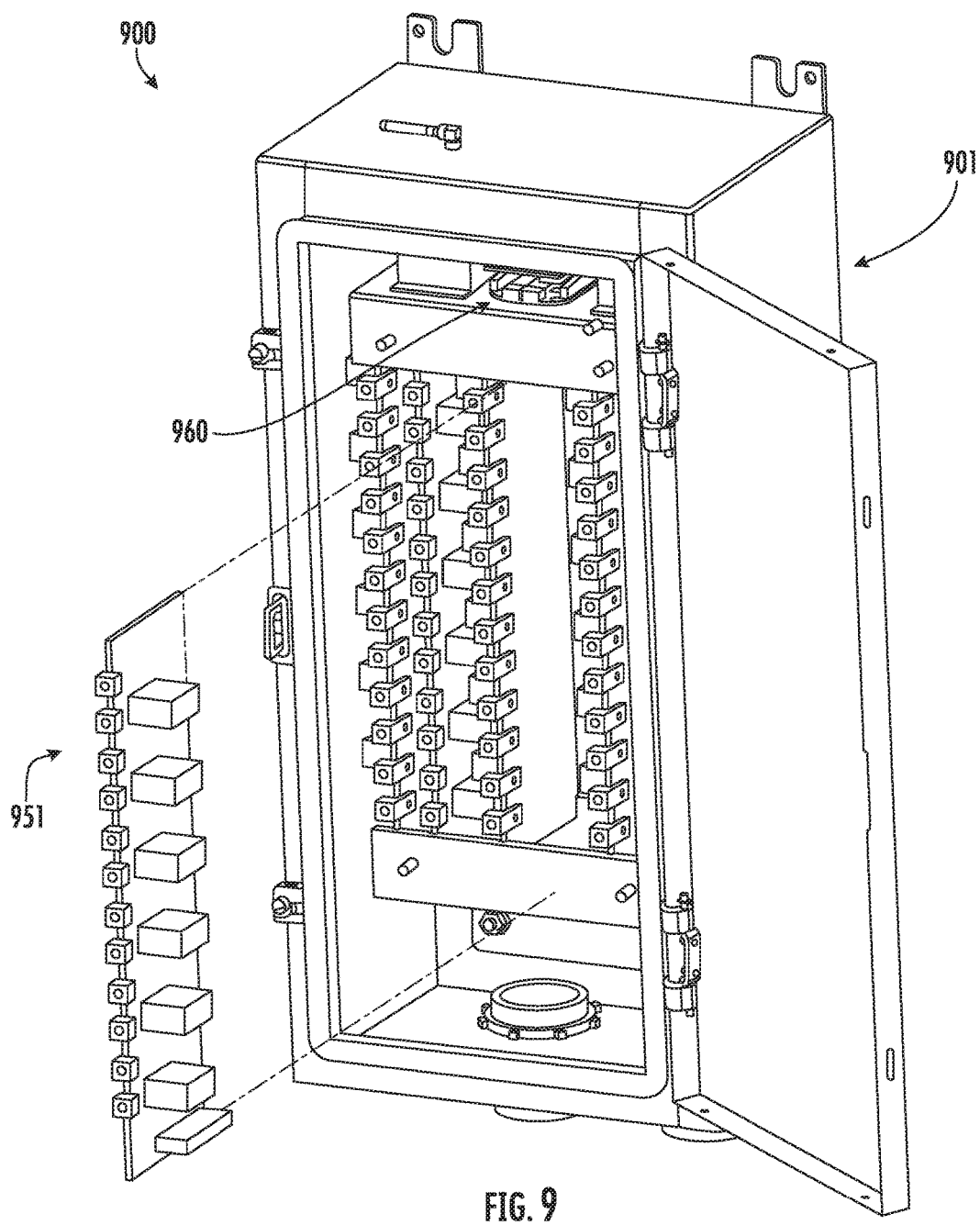
FIG. 9 is a schematic diagram of a depiction of one possible embodiment of the device with the internal aspects of the device shown, including groups of nodes on circuit boards placed in the overall device.

FIG. 8 and FIG. 9 show other possible embodiments of the invention taught herein whereby several groupings of nodes on circuit boards (851 and 951, respectively) are configured together and placed in an enclosure (801 and 901). The groupings of nodes may have their own processing unit(s) or share a processing unit(s) 960. In this example, each grouping of nodes has or shares one controller, although in embodiments, each node may have a controller or all nodes or grouping of nodes may share one controller.

Figure 10:
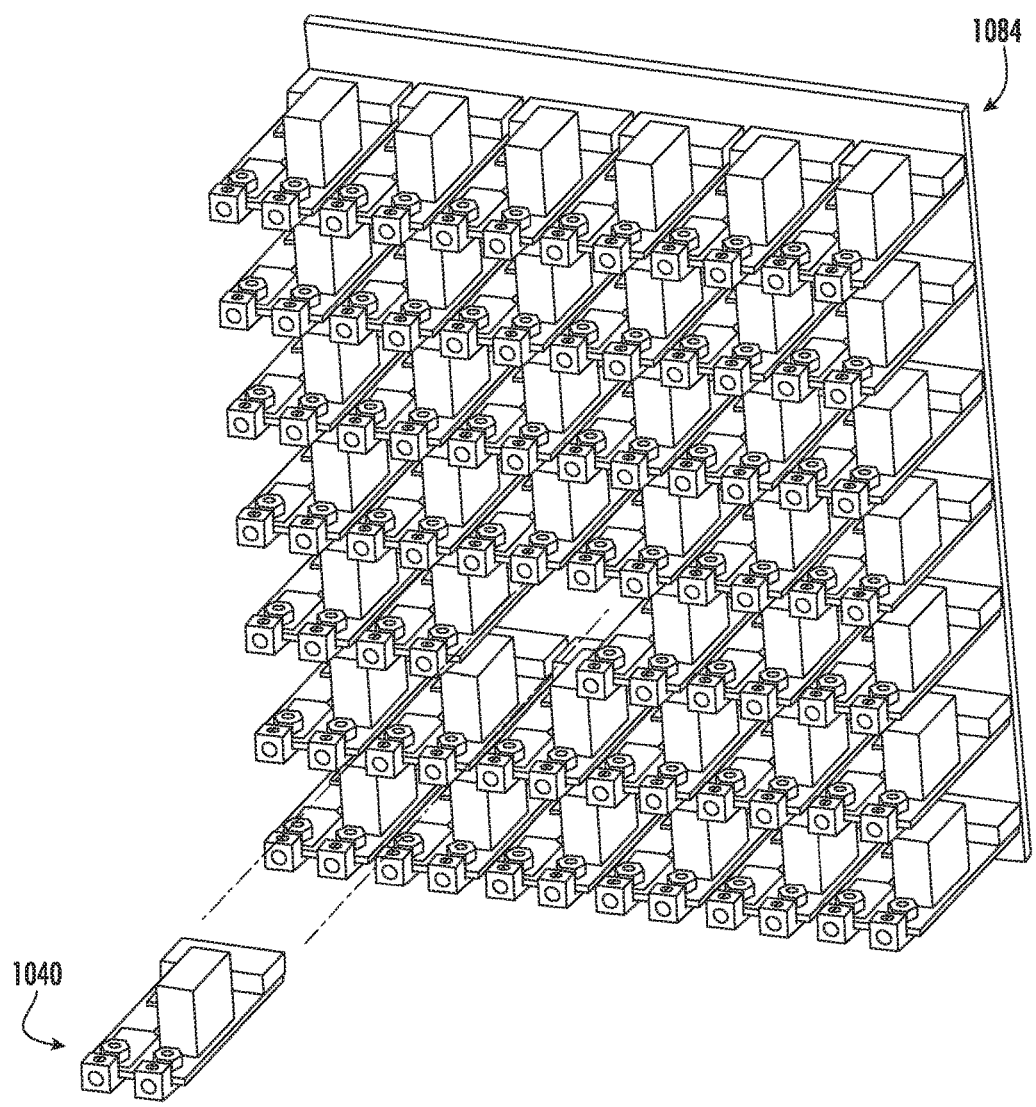
FIG. 10 is a schematic diagram of a depiction of one possible embodiment of a group of nodes configured together.

FIG. 10 shows multiple nodes 1040. Each node 1040 is connected to a single back plane 1084 in this example, which is in communication with a processing unit(s).

Figure 11:
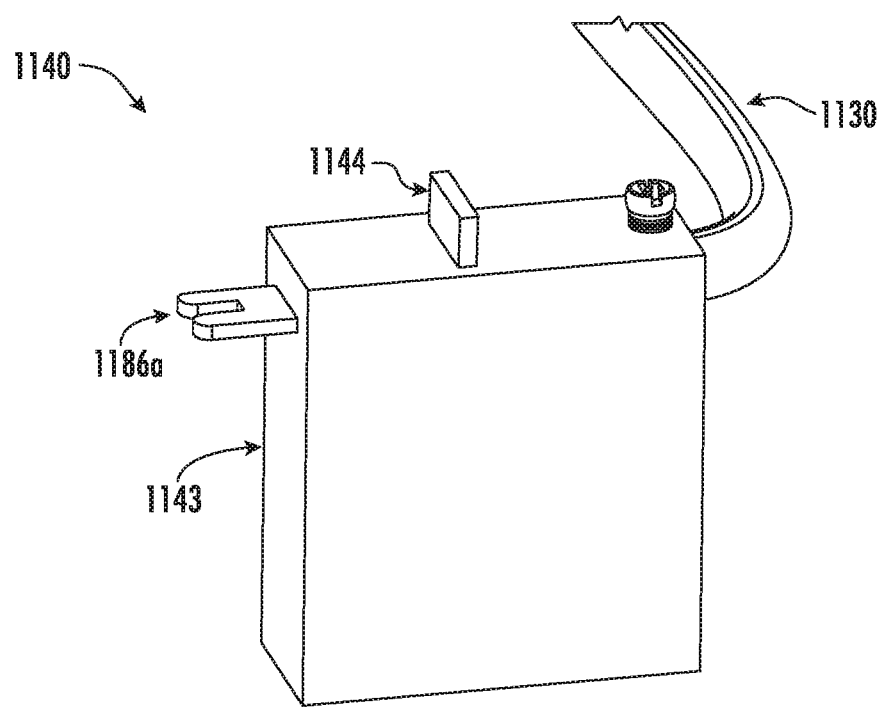
FIG. 11 is a schematic diagram of a close-up depiction of one possible embodiment of the node.

FIG. 11 shows a single node 1140 placed in an enclosure 1143. In this embodiment, the node 1140 is designed in a way to connect directly to a circuit breaker by high voltage socket/connector/lug/port/terminal 1186*a* and pass the electricity to a load on premises through a high voltage electrical line 1130. In this example, the high voltage line 1130 is presented by an existing wire that originally connects a circuit breaker and a load on premises. The node 1140 is connected to a communication rail by low voltage node connector 1144.

Figure 12:
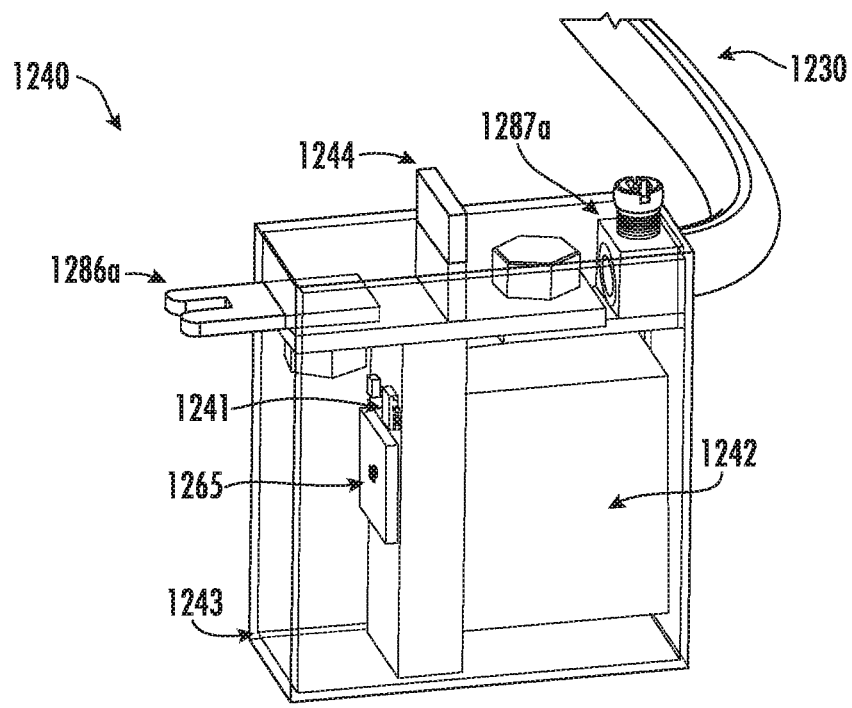
FIG. 12 is a schematic diagram of a close-up depiction of one possible embodiment of the node showing internal components.

FIG. 12 shows the internal configuration of a single node 1240 (as shown on FIG. 11 1140) that is installed adjacent to or near a circuit breaker. In this example, the node 1240 is placed in an enclosure 1243. High voltage socket/connector/lug/port/terminal 1286*a* is used to connect the node 1240 to an existing circuit breaker. High voltage socket/connector/lug/port/terminal 1287*a* is used to connect the node 1240 to a high voltage electrical line 1230 to pass electricity to a load on a premises. A low voltage connector 1244 is used to connect the node 1240 to a communication rail, circuit board, back plane, another node, or other aspect of the system. The node 1240 also contains a relay 1242 and a current and/or voltage senor 1241 to control and measure electricity flow on the electrical circuit. Readings taken by sensor(s) 1241 are communicated, received, processed, stored and/or sent by the controller chip 1265. The controller chip 1265 also sends on/off commands or otherwise interacts with the relay 1242. The controller chip 1265 may communicate with other nodes, groups of nodes, processing unit(s) or other devices by means of connection through the connector port 1244, wirelessly, by low voltage connection lines, or other forms of communicating.

Figure 13:
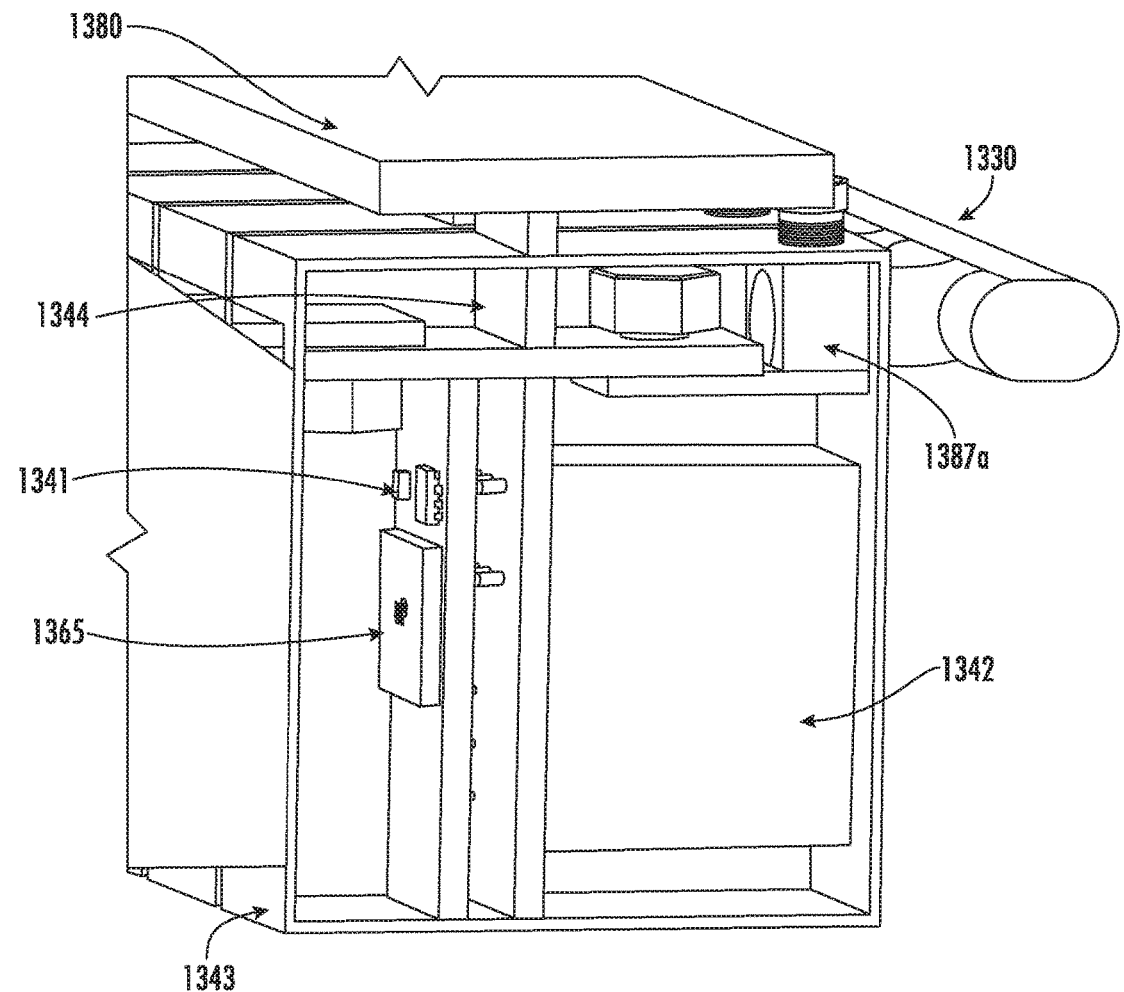
FIG. 13 is a schematic diagram of a close-up depiction of one possible embodiment of the node showing internal components.

FIG. 13 shows a cross sectional view of the node embodiment previously demonstrated in FIG. 11 and FIG. 12. FIG. 13 illustrates previously described elements such as node enclosure 1343, current/voltage sensor(s) 1341, relay 1342, low voltage connector 1344, high voltage socket/connector/lug/port/terminal 1387*a* and high voltage electrical line 1330. In addition, FIG. 13 demonstrates a connection rail or circuit board 1380 designed to carry low voltage signals to/from the node as well as to carry power needed to operate the node. In this aspect, a node is attached to the connection rail 1380 by low voltage connector 1344.

Figure 14:
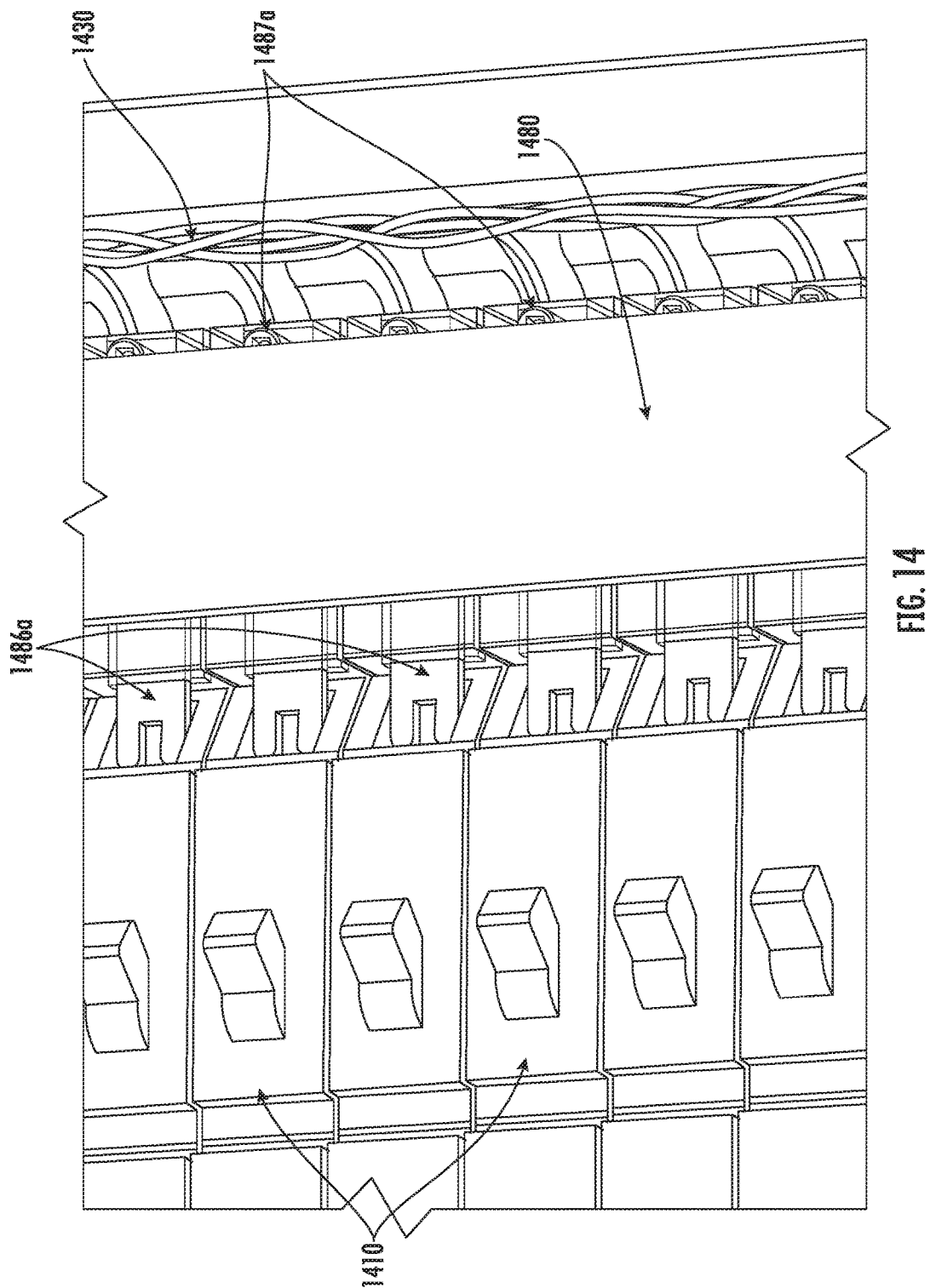
FIG. 14 is a schematic diagram of another possible embodiment of the device connected to an existing circuit breaker panel.

FIG. 14 shows connection rail 1480 covering and/or connected to several nodes that are attached to existing circuit breakers 1410 by high voltage socket/connector/lug/port/terminals 1486*a* and to high voltage electrical line 1430 by high voltage socket/connector/lug/port/terminals 1487*a*.

Figure 15:
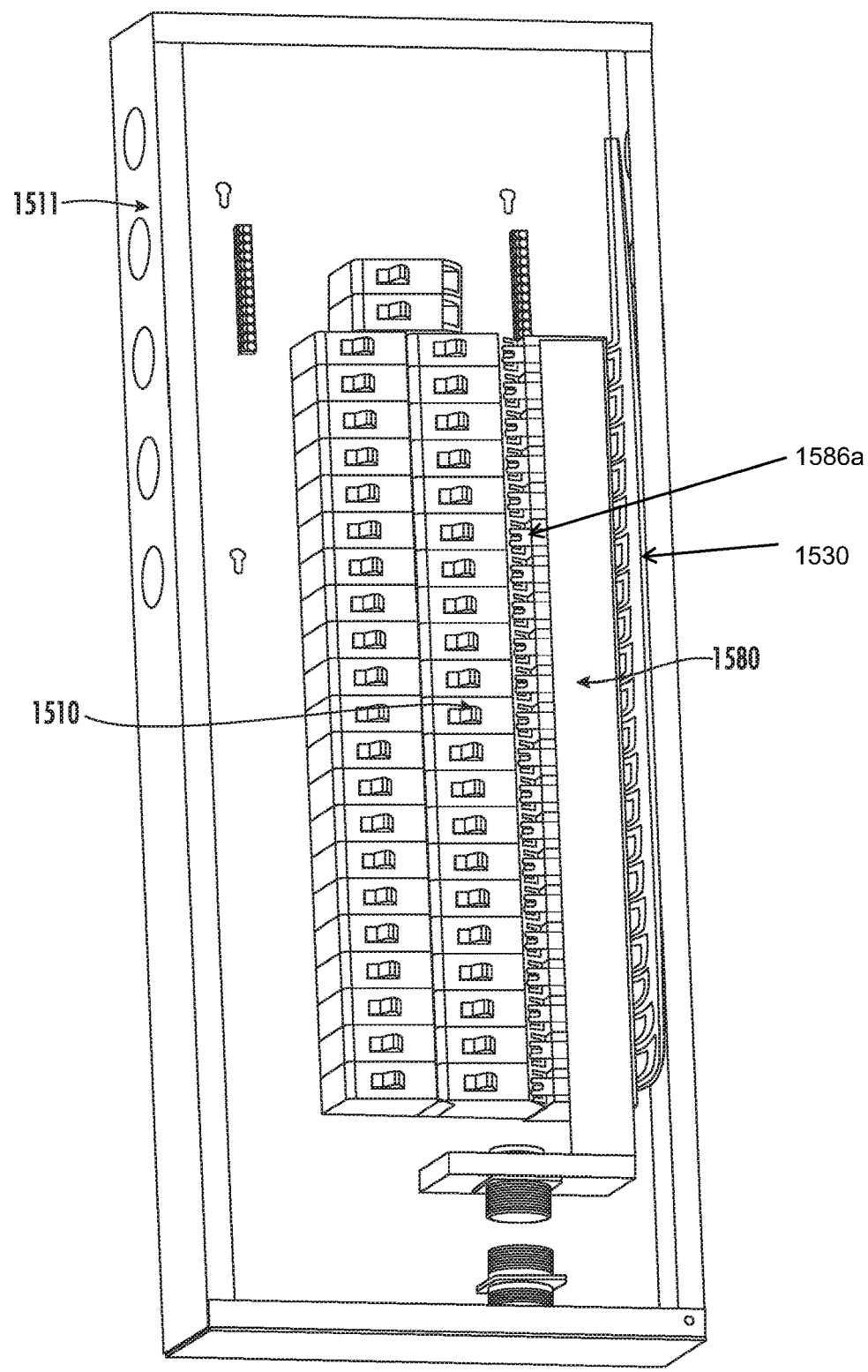
FIG. 15 is a schematic diagram showing a possible connection of an embodiment of the device as connected to an existing circuit breaker panel, with a close-up on the connections to the circuit breaker.

FIG. 15 shows multiple nodes installed adjacent to existing circuit breakers 1510 in an existing circuit breaker panel, and connected by connection rail 1580 covering and/or connected to said nodes. Each node is coupled to an existing circuit breaker by high voltage socket/connector/lug/port/terminals 1586*a* and to electrical loads on a premises by high voltage electrical line 1530.

Figure 16:
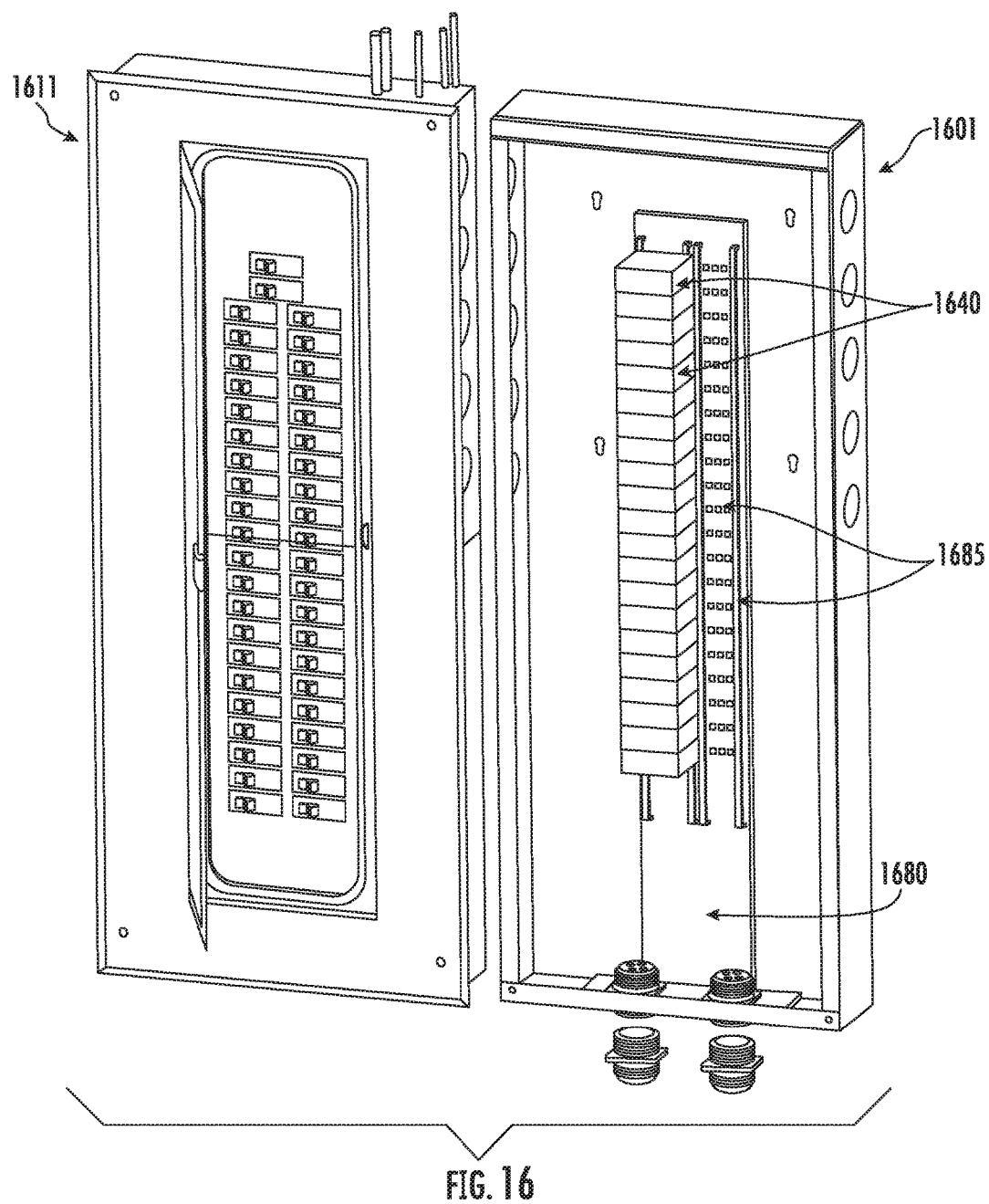
FIG. 16 is a schematic diagram of another possible embodiment of the device as connected to an existing circuit breaker panel.

FIG. 16 shows another possible configuration of the device. This example shows the containing unit 1601 installed adjacent to an existing circuit breaker panel 1611. Nodes 1640 are installed in one or more vertical rows (only one row is shown populated in FIG. 16 for demonstration purposes only) resembling a standard circuit breaker panel layout. Each node 1640 is attached to a node pad 1685 located on a back plane 1680.

Figure 17:
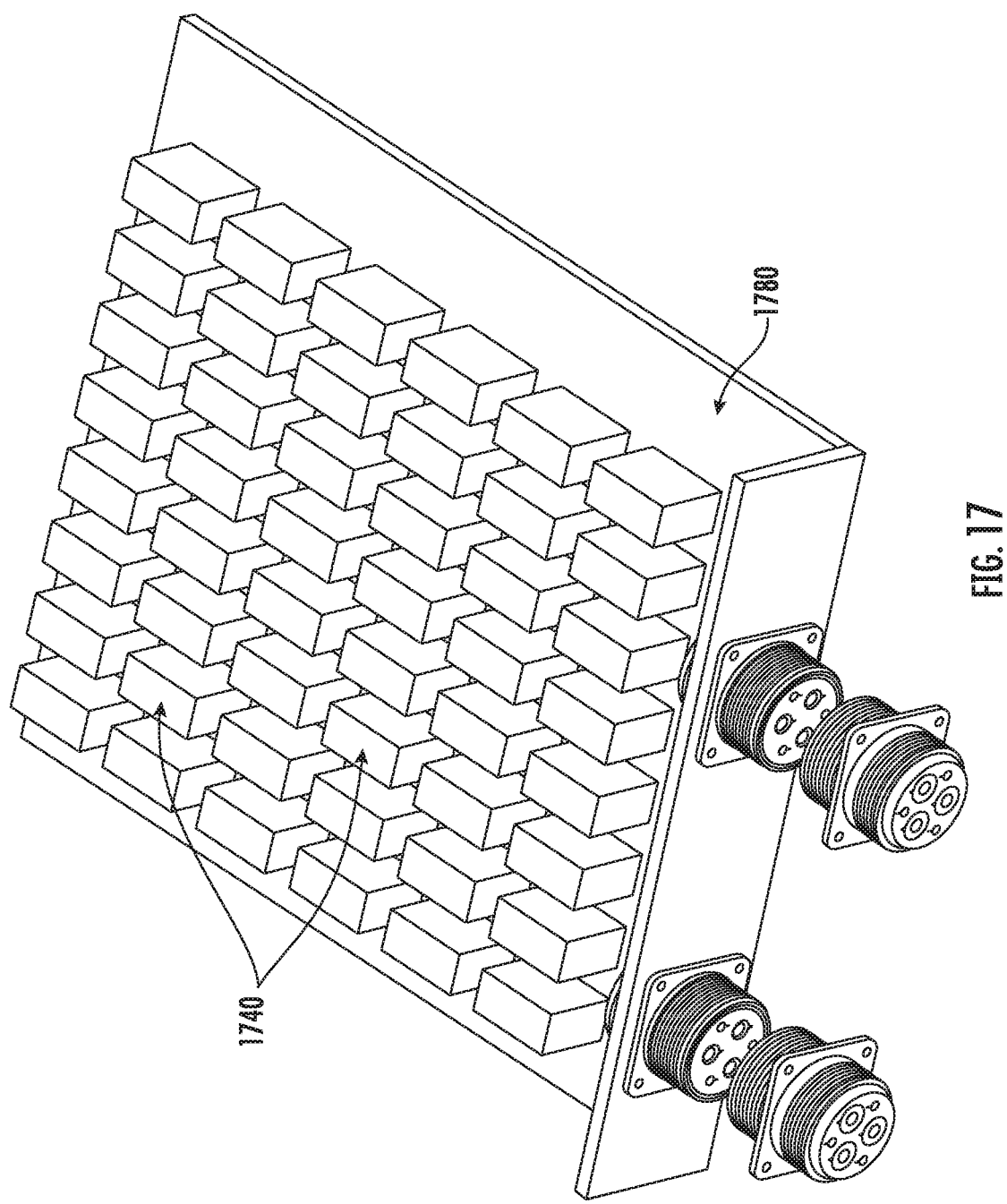
FIG. 17 is a schematic diagram of a depiction of one possible embodiment of a group of nodes configured together.

FIG. 17 shows another possible configuration of node placement wherein a single back plane 1780 is populated with individual nodes 1740.

Figure 18:
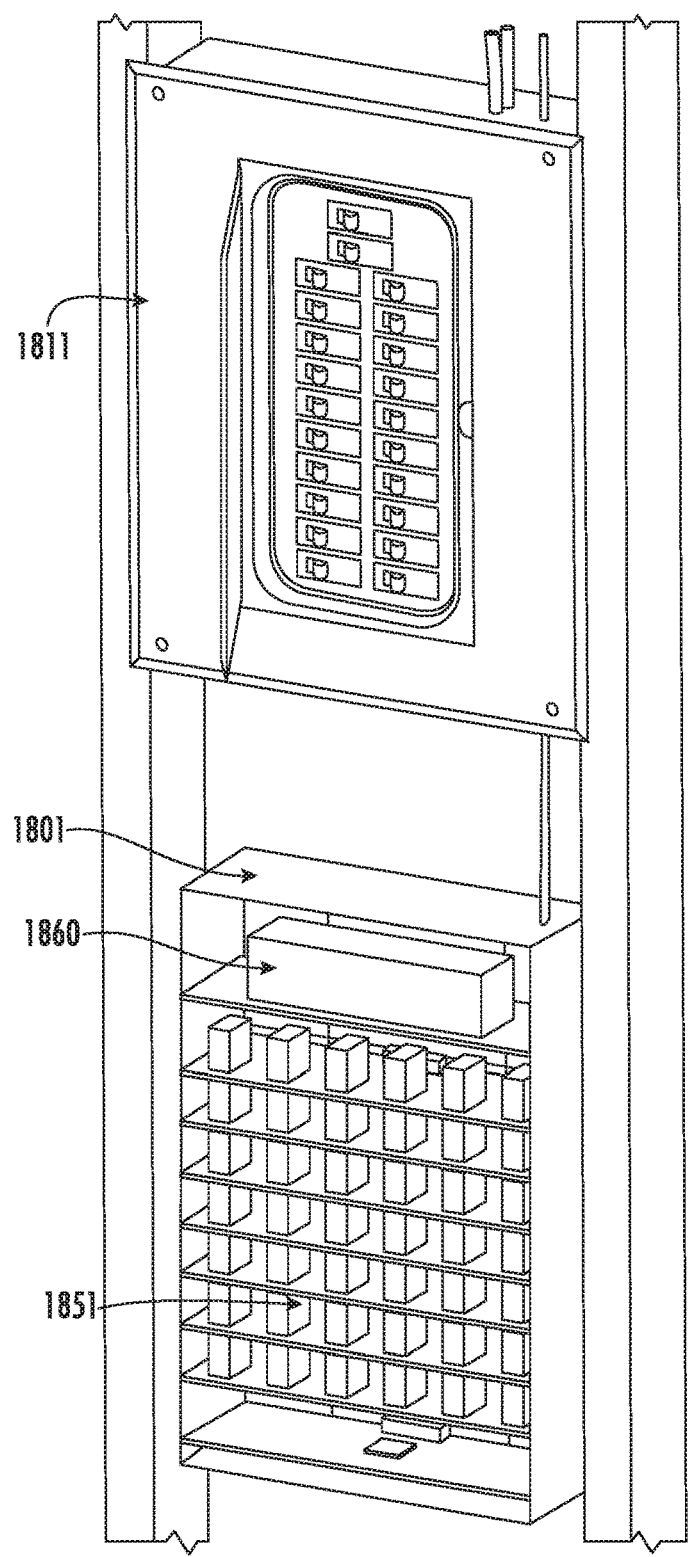
FIG. 18 is a schematic diagram of a depiction of one possible embodiment of a group of nodes configured together as connected to an existing circuit breaker panel.

FIG. 18 shows different arrangements and possible connections to an existing circuit breaker panel 1811. In this embodiment, the containing unit 1801 is installed under the existing circuit breaker panel 1811. The containing unit 1801 is populated with groups of nodes hosted on one or more circuit boards 1851 and a processing unit 1860. A sample electric wiring is demonstrated to show connection or coupling of the apparatus to the existing circuit breaker box 1811.

Figure 19:
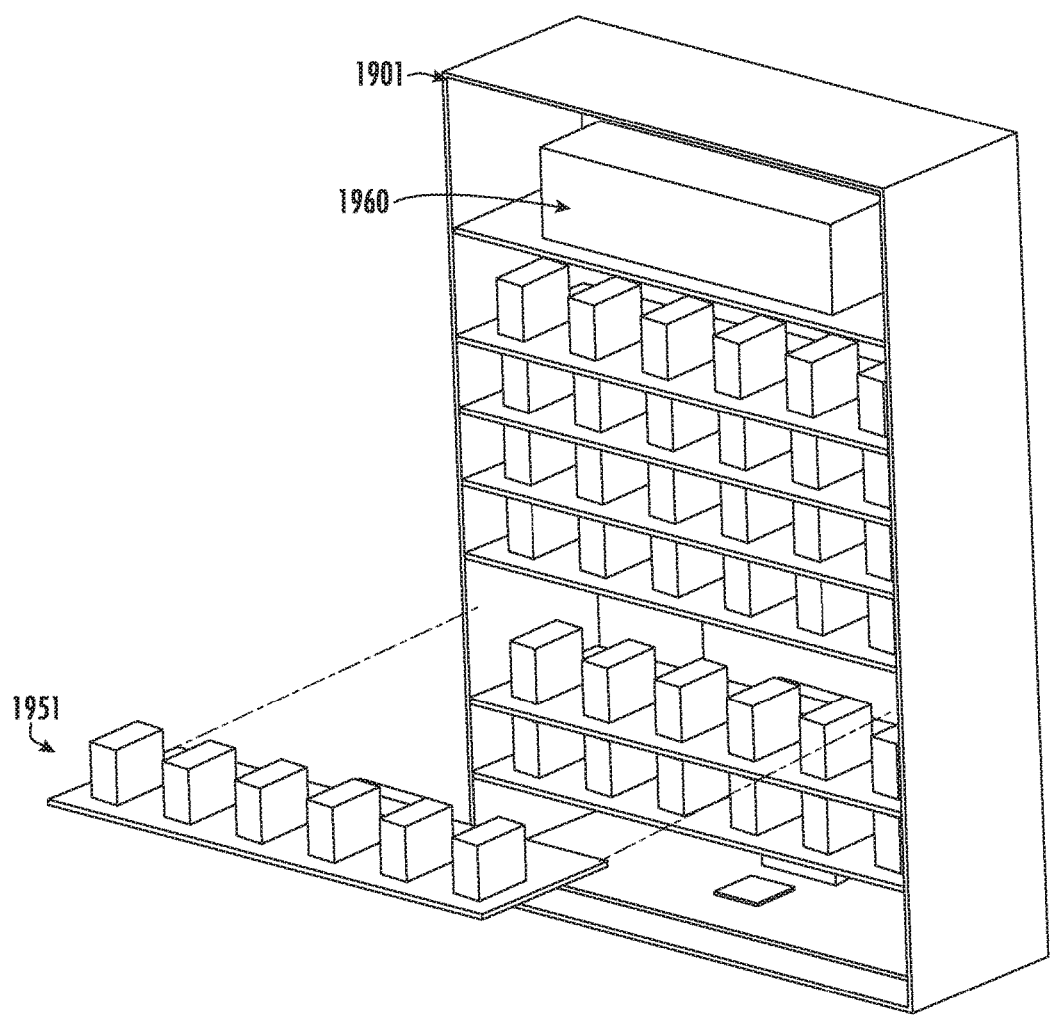
FIG. 19 is a schematic diagram of a depiction of one possible embodiment of a group of nodes configured together.

FIG. 19 shows the apparatus previously demonstrated in FIG. 18 in more detail. In particular, it illustrates groups of nodes hosted on a single circuit board 1951 and placed into a containing unit or housing 1901, as well as placement of the processing unit 1960.

Figure 20:
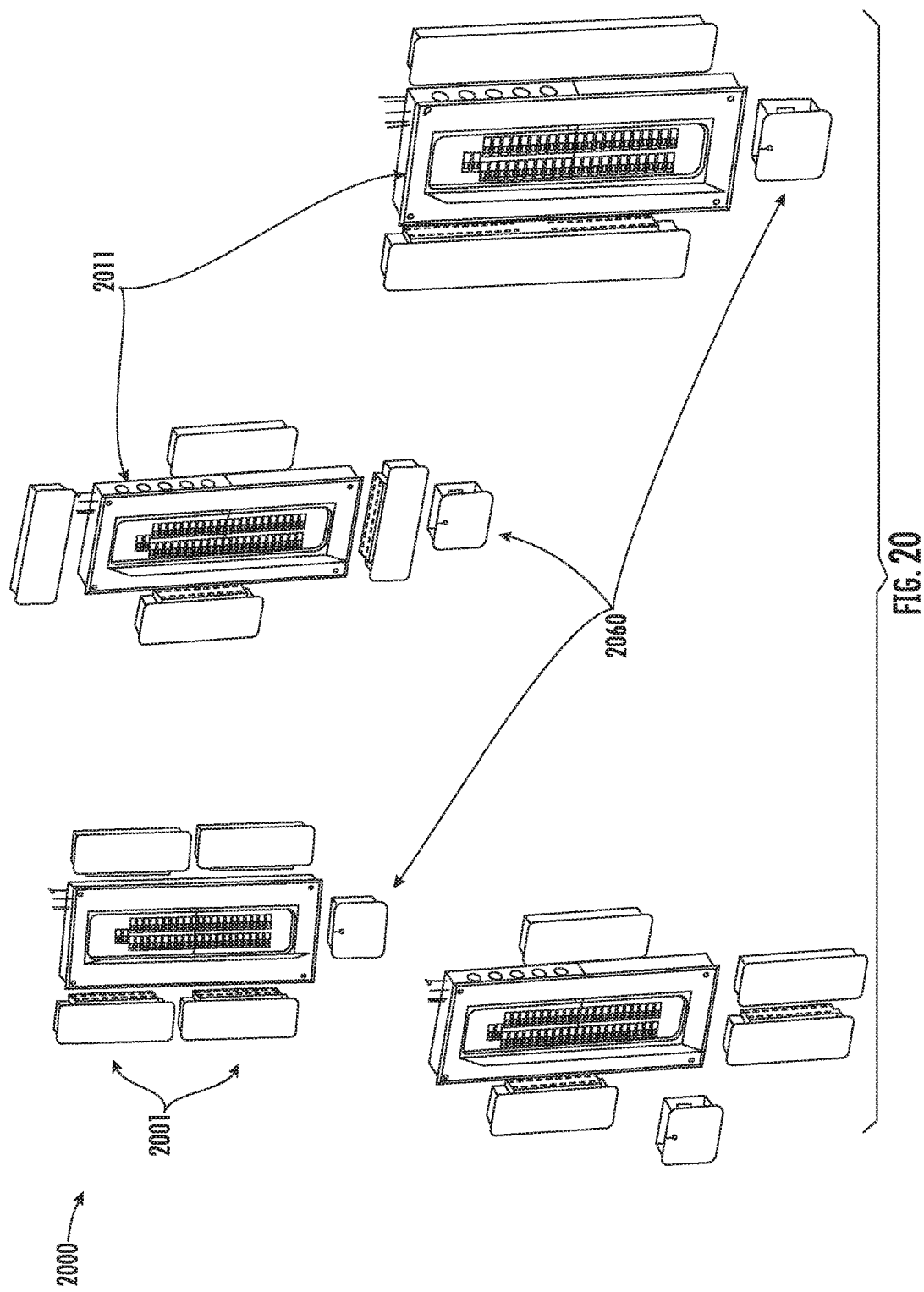
FIG. 20 is schematic diagrams of other possible embodiments of the device as connected to an existing circuit breaker panel.

FIG. 20 shows several possible configurations of nodes, controllers, and processing units as placed in and around an existing circuit breaker panel 2011, or otherwise connected to/coupled to a circuit breaker panel either wirelessly or by wired connection. Each separate aspect of the configurations may include one or more nodes, one or more controllers, and/or one or more processors. Alternatively, each separate grouping may include one or more nodes, one controller, and/or one or more processors. Each separate groupings of one or more nodes may include one or more controllers, and one processor. The groupings of nodes may also share one or more controllers or processors. The groupings of nodes may also share one controller. The groupings of nodes may also share one processor. Units of one or more nodes, one or more controllers, and/or one or more processors may be separated and either wirelessly or by wired connection connected/coupled together and/or with the circuit breaker panel. The illustrated examples demonstrate placements of a processing unit 2060 and multiple containing units/housings 2001.

Figure 21:
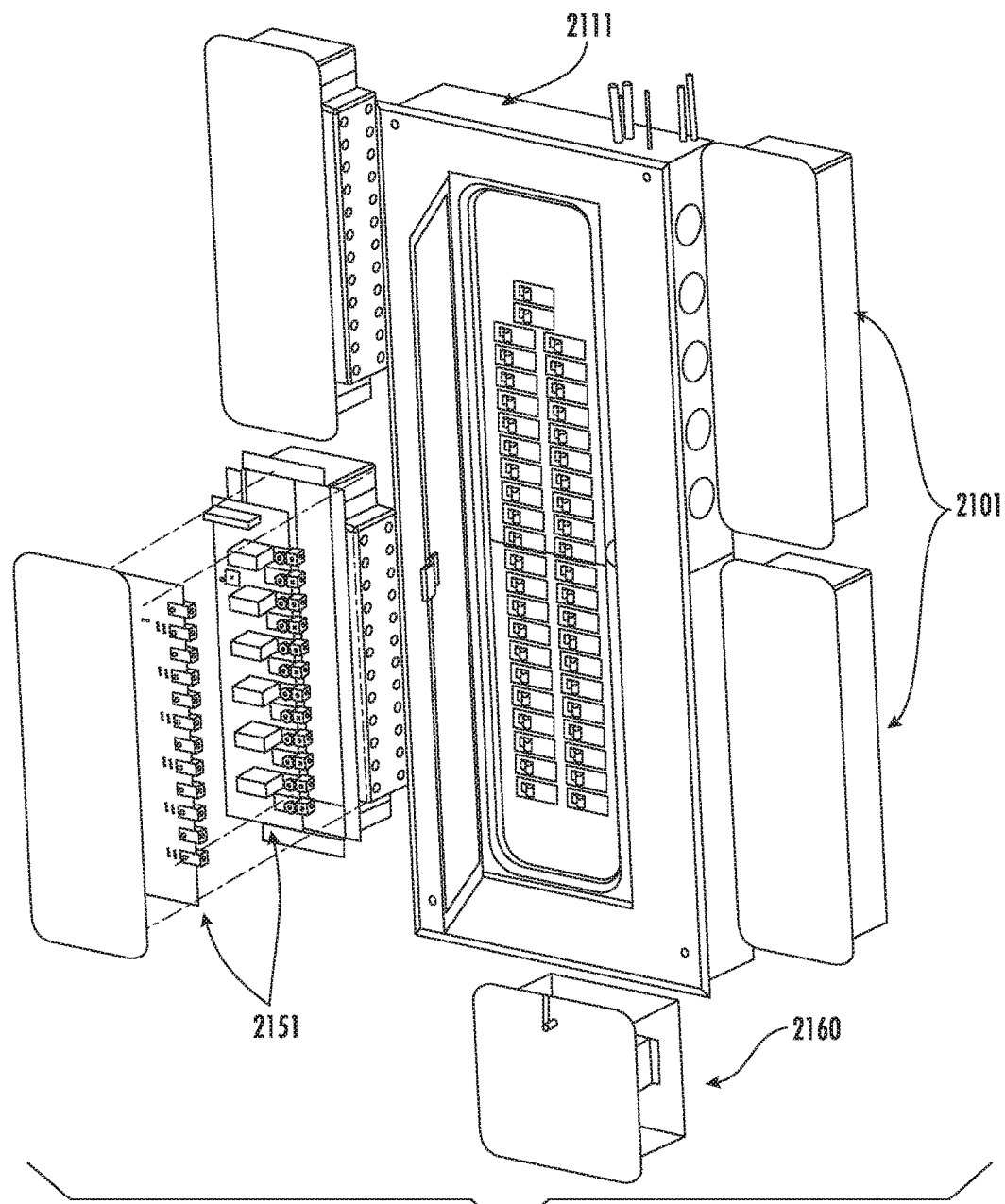
FIG. 21 is a schematic diagram of a possible embodiment of the device showing internal components, as connected to an existing circuit breaker panel.

FIG. 21 depicts one of the possible configurations of nodes, controllers, and processing unit represented in FIG. 20. In this embodiment, the processing unit 2160 is separated from multiple containing units 2101 near or adjacent to the existing circuit breaker panel 2111. Each containing unit/housing 2101, in this example, hosts two groups of nodes placed on a single circuit board 2151. Each containing unit/housing may be structurally, mechanically, and/or electrically coupled to the circuit breaker panel.

Figure 22:
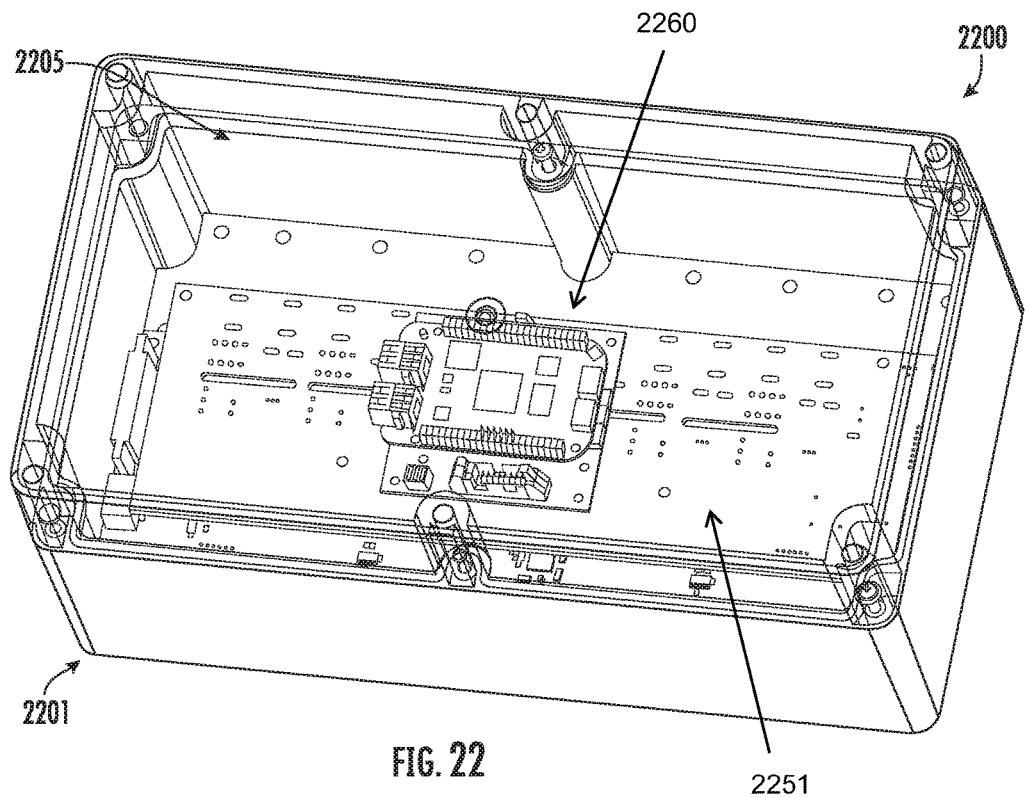
FIG. 22 is a schematic diagram of a possible embodiment of the device as designed for placement in a base frame with a lid.

FIG. 22 represents another possible configuration of the apparatus 2200 designed for placement in a base frame 2201 with a lid 2205. An example of a processing unit 2260 and circuit board 2251 with nodes is also depicted in the containing unit 2201 of FIG. 22.

Figure 23:
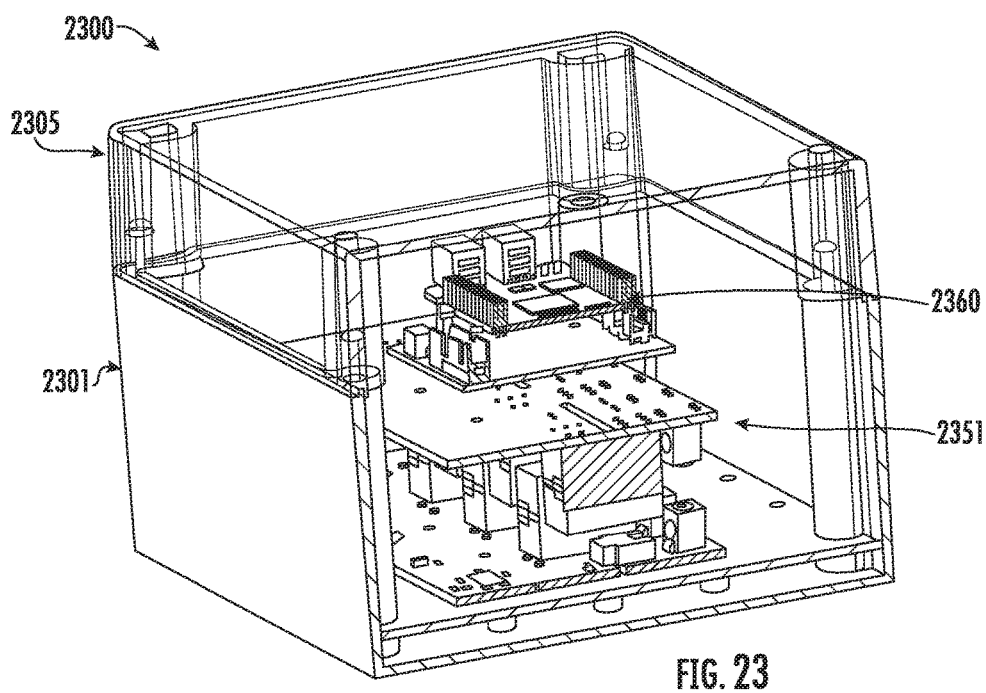
FIG. 23 is a schematic diagram of a possible embodiment of the device as designed for placement in a base frame with a lid.

FIG. 23 shows a cross sectional view of the configuration of the apparatus 2300 (demonstrated as 2200 in FIG. 22). In this embodiment, groups of nodes are hosted on a single circuit board 2351 and, along with a processing unit 2360, are placed into the base frame 2301 and covered with a lid 2305.

Figure 24:
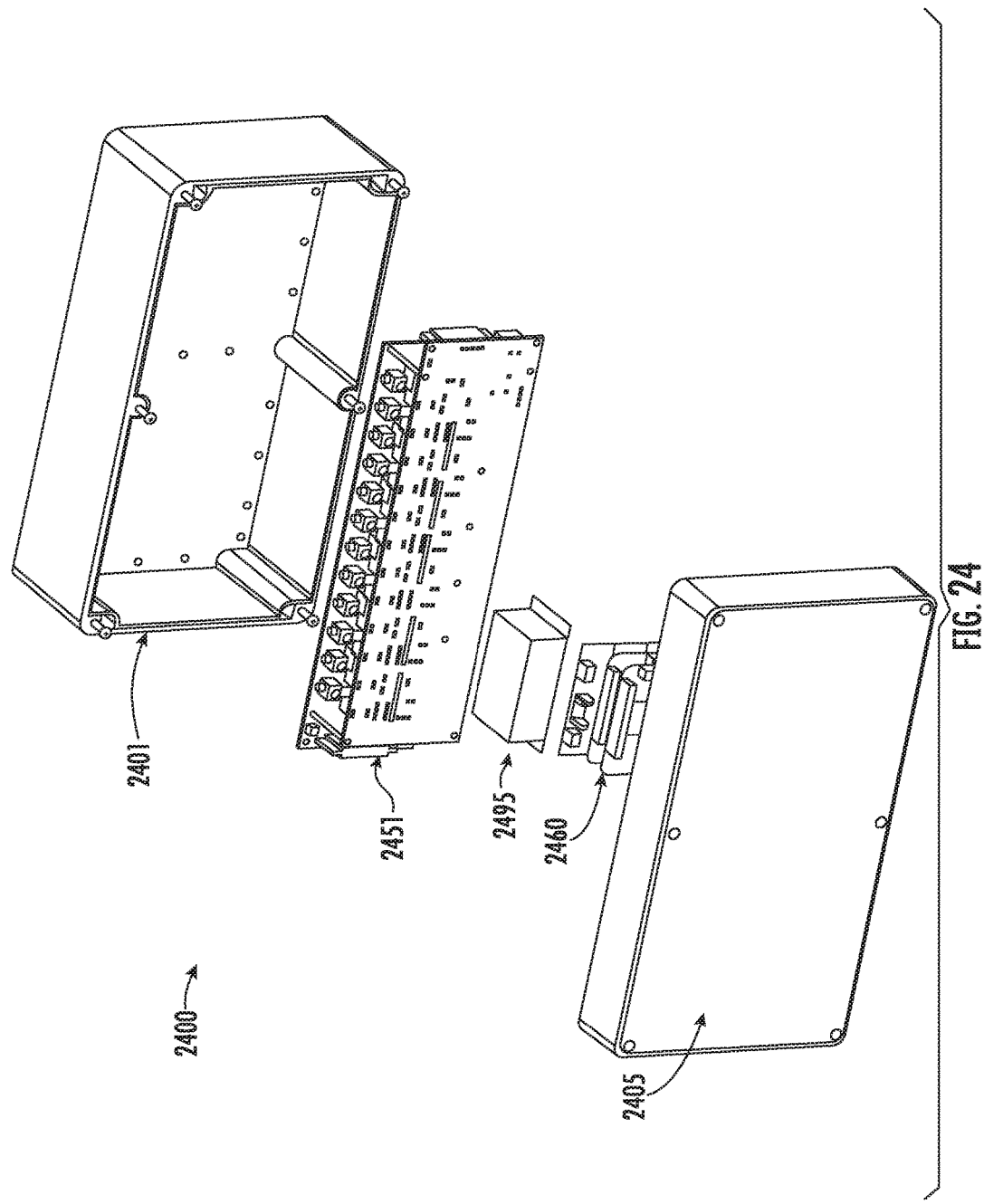
FIG. 24 is a schematic diagram of a possible embodiment of the device with groups of nodes hosted on a single circuit board.

FIG. 24 shows an exploded view of the apparatus 2400 (demonstrated as 2200 in FIGS. 22 and 2300 in FIG. 23). The base frame 2401 hosts groups of nodes on a single circuit board 2451, battery 2495, and processing unit 2460. The components are covered with the lid 2405.

Figure 25:
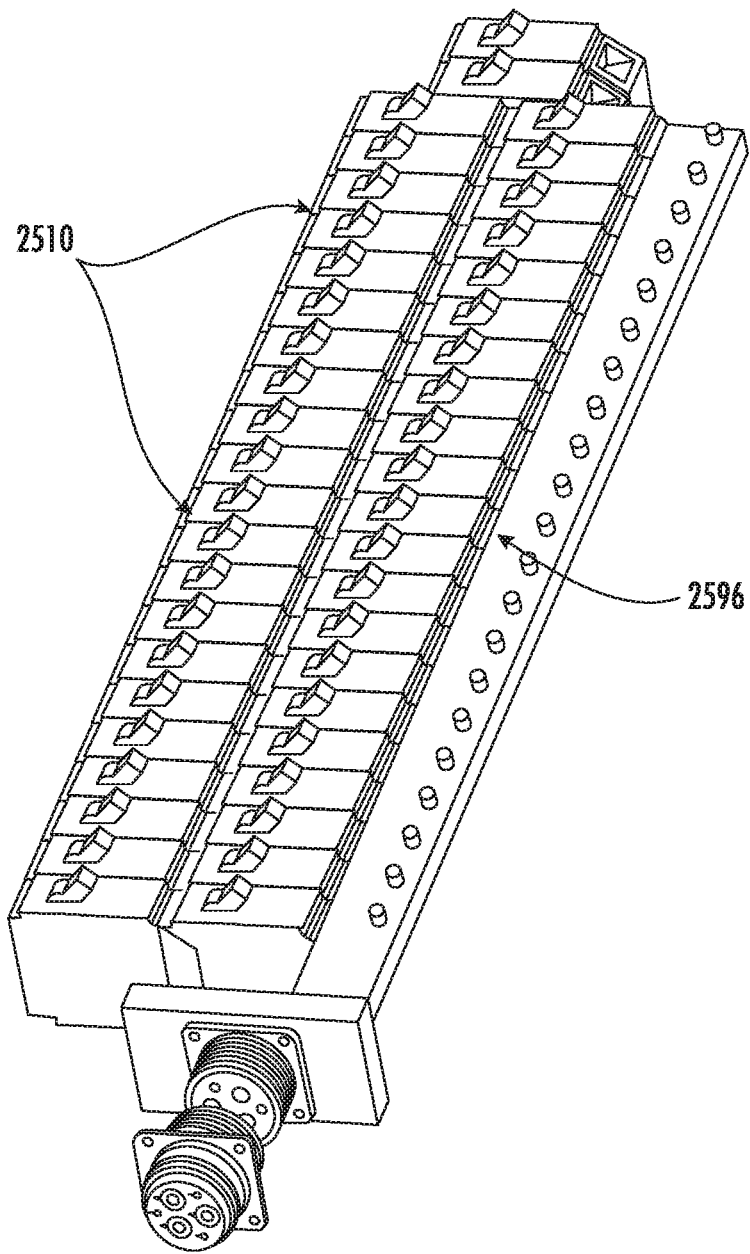
FIG. 25 is a schematic diagram of a possible embodiment of the device showing a connection unit, base, or bar for facilitated connection to a circuit breaker panel.

FIG. 25 shows a connection unit, base, or bar 2596, whereby the invention as taught herein is connected directly to the circuits 2510 on a circuit breaker panel, thereby facilitating connection of the invention taught herein to a circuit breaker panel.

One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. An apparatus for managing energy consumption comprising:
   one or more node electrically connected to one or more circuit breaker on one or more circuit breaker panel and one or more electrical load on a premises, the one or more node comprising one or more current sensor and one or more relay;
   one or more controller connected to the one or more node, wherein the one or more controller is capable of performing calculations on information received from the one or more current sensor;
   one or more processing unit connected to and in communication with the one or more node and/or the one or more controller, wherein the one or more processing unit sends a first set of commands and/or instructions to the one or more node and/or the one or more controller, and/or wherein the one or more processing unit receives the information from the one or more node and/or the one or more controller, and/or receives the calculations from the one or more controller, and processes, stores, and/or communicates to one or more remote electronic device the information and/or the calculations;
   one or more link for wired or wireless communication first with the one or more processing unit, the one or more node, or the one or more controller, and second with the one or more remote electronic device, wherein the one or more remote electronic device sends a second set of commands and/or instructions to the one or more processing unit, the one or more node, and/or the one or more controller to directly or indirectly control an operation of the one or more relay; and
   one or more housing, separate panel, containing unit, and/or board for hosting the one or more node, the one or more controller, and/or the one or more processing unit;
   wherein the one or more housing, separate panel, containing unit, and/or board is detachably structurally, mechanically and/or electrically coupled to the one or more circuit breaker panel and/or the one or more circuit breaker on the one or more circuit breaker panel.

2. The apparatus of claim 1, wherein the one or more remote electronic device is chosen from one or more of a phone, a computer, and a server.

3. The apparatus of claim 1, wherein the one or more node is connected to one or more circuit board, which is detachably coupled to the apparatus.

4. The apparatus of claim 1, wherein the one or more node is connected to one or more circuit board, which is a back plane, which is detachably coupled to the apparatus.

5. The apparatus of claim 1, wherein the one or more node comprises:
   a connection for an electrical line in;
   a connection for an electrical line out;
   the one or more relay; and
   the one or more current sensor.

6. The apparatus of claim 1, wherein the one or more node comprises at least three of the following:
   (a) the one or more current sensor;
   (b) a voltage sensor(s);
   (c) the one or more relay;
   (d) a computer chip(s) to perform at least one of:
      receive, convert, process, store, and/or send signals to and/or from the one or more current sensor and/or the voltage sensor(s);
      receive, convert, process, store, and/or send signals to and/or from the one or more relay; and/or
      receive, convert, process, store, and/or send the information, signals, algorithms, and/or computer code to and/or from other(s) of the one or more node, other(s) of the computer chip(s), the one or more controller, or the one or more processing unit;
   (e) electric sockets, prongs, terminals, and/or lugs;
   (f) port(s) or pin(s) for the wired communication for the purposes of initial setup and/or troubleshooting of the one or more node;
   (g) light source(s);
   (h) sound source(s);
   (i) one or multiple physical buttons for the purposes of the initial setup and/or the troubleshooting and/or manual operation of the one or more node;
   (j) a circuit board residing within the one or more node for hosting part(s) of the one or more node;
   (k) an enclosure for part(s) of the one or more node;
   (l) connectors for attachment to a connection rail, a base frame, the containing unit, a mounting base, a circuit board located outside of the one or more node, a back plane, or other(s) of the one or more node; and/or
   (m) sockets or prongs to connect the one or more node to the circuit board located outside of the one or more node.

7. The apparatus of claim 1, wherein the one or more remote electronic device receives the information and/or the calculations from the one or more controller or the one or more processing unit and is used to send a transmission to the one or more processing unit or the one or more controller to switch on or off one or more of the one or more node, the one or more relay on the one or more node, and/or the one or more electrical load.

8. The apparatus of claim 1, wherein the one or more node electrically connected to the one or more circuit breaker on the one or more circuit breaker panel and the one or more electrical load comprises a closed loop electrical system.

9. The apparatus of claim 1, wherein the one or more node comprises:
the one or more current sensor designed to measure electric current by a circuit;
a voltage sensor designed to measure electric voltage by the circuit; and
the one or more relay designed to switch on or off electric power from the circuit.

10. The apparatus of claim 1, wherein the one or more node or a group of the one or more node comprises one or more connector for attachment to the one or more housing, separate panel, containing unit, and/or board, another of the one or more node, the one or more controller, the one or more processing unit, and/or the one or more circuit breaker on the one or more circuit breaker panel.

11. The apparatus of claim 1 wherein the one or more processing unit comprises at least three of the following:
(a) a computer chip(s) to perform at least one of:
runs software operating the apparatus; and/or
send and/or receive low-voltage signals to and/or from the one or more node;
(b) a wireless communication module(s) enabling the wireless communication to the one or more remote electronic device and/or Internet connection;
(c) a port(s) for the wired communication for the purposes of initial setup and/or troubleshooting of the one or more processing unit;
(d) a power connector, a power adapter, and/or a power module to receive electrical power to run the one or more processing unit and/or the one or more node;
(e) a battery or other power storage;
(f) a voltage sensor(s) to measure electrical voltage;
(g) a circuit board or multiple circuit boards for hosting parts of the one or more processing unit;
(h) connector(s) to attach the circuit board or the containing unit;
(i) a light source;
(j) a sound source;
(k) one or multiple physical buttons for the purposes of the initial setup and/or the troubleshooting and/or manual operation of the one or more processing unit; and/or
(l) an enclosure for parts of the one or more processing unit.

12. The apparatus of claim 1, wherein the one or more processing unit comprises another of the one or more controller designed to send and/or receive low-voltage signals to and/or from the one or more node.

13. The apparatus of claim 1, wherein the one or more processing unit comprises one or more wireless communication chip enabling the wireless communication to the one or more remote electronic device and/or Internet connection, or one or more port or socket for receiving a wire to enable the wired communication to the one or more remote electronic device and/or the Internet connection.

14. The apparatus of claim 1, wherein the one or more processing unit comprises a power connector designed to receive electrical power.

15. The apparatus of claim 1, wherein the one or more processing unit comprises a battery or other power storage to power the apparatus and/or parts of the apparatus.

16. The apparatus of claim 1, wherein the one or more processing unit comprises a voltage sensor designed to measure electric voltage of the electrical load on the premises.

17. The apparatus of claim 1, wherein the one or more processing unit comprises one or more connector designed to attach the one or more processing unit to the containing unit, the one or more node, and/or the one or more circuit breaker on the one or more circuit breaker panel.

18. The apparatus of claim 1, wherein the one or more processing unit comprises one or more connector designed to power illumination on the apparatus.

19. The apparatus of claim 1, wherein the one or more processing unit comprises a circuit board.

20. The apparatus of claim 1, wherein the one or more processing unit comprises one or more button, one or more lever, and/or one or more physical switch for the purposes of initial setup and/or troubleshooting and/or manual operation of the one or more processing unit.

21. The apparatus of claim 1 further comprising a source of illumination and/or a source of sound.

22. The apparatus of claim 1, wherein the one or more circuit breaker on the one or more circuit breaker panel is an existing or previously installed circuit breaker and/or existing or previously installed circuit breaker panel, the apparatus is electrically connected to the existing or previously installed circuit breaker and/or the existing or previously installed circuit breaker panel.

23. The apparatus of claim 1, wherein the one or more node, the one or more controller, and the one or more processing unit are contained in or on a single one of the one or more housing, separate panel, containing unit, and/or board.

24. The apparatus of claim 1, wherein the one or more controller is located within the one or more node or is located outside the one or more node.

25. A method of controlling one or more electrical load on a premises, the method comprising:
providing one or more node comprising one or more current sensor and one or more relay, the one or more node electrically and detachably connected first to one or more circuit breaker on one or more circuit breaker panel and second to one or more electrical load on the premises;
providing one or more controller connected to the one or more node, wherein the one or more controller is capable of performing calculations on information received from the one or more current sensor;
providing one or more processing unit in communication with the one or more controller and/or the one or more node, wherein the one or more processing unit receives the information from the one or more controller and/or the one or more node, and/or receives the calculations from the one or more controller, and transmits instructions to the one or more controller and/or the one or more node relating to operation of the one or more electrical load on the premises based in whole or in part on the information received from the one or more controller and/or the one or more node, and/or the calculations received from the one or more controller; and
communicating data to and/or from one or more remote electronic device, wherein the one or more relay on the one or more node receives the instructions relating to operation of the one or more electrical load on the premises based upon the data communicated from the one or more remote electronic device.

26. The method of claim 25, wherein the one or more relay receives the instructions to turn on or off an electrical connection to the one or more electrical load on the premises.

27. The method of claim 26, wherein the one or more processing unit transmits the instructions to the one or more controller or the one or more node to have the one or more relay turn on or off the electrical connection to the one or more electrical load on the premises.

28. The method of claim 25, wherein the one or more remote electronic device is chosen from one or more of a phone, a computer, or a server.

29. The method of claim 25, wherein the one or more controller is located within the one or more node or is located outside the one or more node.

* * * * *